United States Patent [19]
Ackerman et al.

[11] Patent Number: 5,481,719
[45] Date of Patent: Jan. 2, 1996

[54] EXCEPTION HANDLING METHOD AND APPARATUS FOR A MICROKERNEL DATA PROCESSING SYSTEM

[75] Inventors: Dennis F. Ackerman, Boynton Beach; Himanshu H. Desai, Boca Raton; Ram K. Gupta, Boca Raton; Ravi R. Srinivasan, Boca Raton, all of Fla.

[73] Assignee: International Business Machines Corporation, Armonk, N.Y.

[21] Appl. No.: 303,796

[22] Filed: Sep. 9, 1994

[51] Int. Cl.$^6$ ............................... G06F 9/44; G06F 9/46
[52] U.S. Cl. ................................ 395/700; 364/DIG. 1; 364/280.8; 364/281.7
[58] Field of Search .................................. 395/700

[56] References Cited

U.S. PATENT DOCUMENTS

| | | | |
|---|---|---|---|
| 4,620,292 | 10/1986 | Hagiwara et al. | 364/748 |
| 5,008,812 | 4/1991 | Bhandarkar et al. | 364/200 |
| 5,043,867 | 8/1991 | Bhandarker et al. | 364/200 |
| 5,127,098 | 6/1992 | Rosenthal et al. | 395/650 |
| 5,159,686 | 10/1992 | Chastain et al. | 395/650 |
| 5,179,702 | 1/1993 | Spix et al. | 395/650 |
| 5,301,137 | 4/1994 | Matsuo et al. | 364/748 |

OTHER PUBLICATIONS

Barreh, J. et al, "The Powerz Processor", Conference Paper, Spring Compcon 94 (Cat. #94CH3414-0) pp. 389-398, IEEE, Feb.-Mar. 1994.

Moore, C. R. et al. "IBM Single Chip RISC Processor (RSC)", Conference Paper, IEEE 1992 Conference (Cat. #92CH3189-8) IEEE, Oct. 1992.

Mike Accetta, et al., "MACH: A New Kernel Foundation for UNIX Development", Proceedings of the Summer 1986 USENIX Conference, Atlanta, Ga.

David Golub, et al., "UNIX as an Application Program", Proceedings of the Summer 1990 USENIX Conference, Anaheim, Calif.

David L. Black, et al., "Microkernel Operating System Architecture and MACH", USENIX Association, pp. 11–30, Apr. 27, 1992.

James M. Phelan, et al., "An OS/2 Personality on MACH", MACH II Symposium, USENIX Association, Apr. 19–21, 1993, Sante Fe, New Mexico.

Michel Gien, "Micro-Kernel Design" *UNIX Review*, vol. 8, No. 11, pp. 58–63.

Michel Gien, "Next Generation Operating Systems Architecture", Lecture Notes in Computer Science, Operating Systems of the 90s and Beyond–International Workshop, A. Karshmer, et al. Eds., Dagstuhl Castle, Germany, pp. 227–232, Jul. 8–12, 1991.

Richard Rashid, "A Catalyst for Open Systems", *Datamation*, vol. 35, No. 10, pp. 32–33, May 15, 1989.

Allan Bricker, et al., "Architectural Issues in Microkernel–based operating systems: the CHORUS Experience," *CHORUS*, vol. 14, No. 6, pp. 347–357, Jul./Aug. 1991.

Robbert van Renesse, et al., "Short Overview of Amoeba", USENIX Association, Apr. 27, 1992, Seattle, Wash.

David L. Cohn, et al., "Basing Micro-Kernel Abstractions on High-Level Language Models", Open Forum '92, The Pan-European Open Systems Event, Proceedings of the Technical Conference, Utrecht, 23–27 Nov., 1992.

Gerald Malan, et al., "DOS as a Mach 3.0 Application", USENIX Association, Nov. 20–22, 1991, Monterey, California.

Joseph Boyken, et al., *Programming Under MACH*, Addison–Wesley Publishing Company, Incorporated, 1993.

*Primary Examiner*—Kevin A. Kriess
*Assistant Examiner*—St. John Courtenay, III
*Attorney, Agent, or Firm*—Pollock, Vande Sande & Priddy

[57] ABSTRACT

Floating point hardware register set is not given to any user level thread unless it is required to perform floating point operations. Thus, for any non-floating thread, its context does not include the floating point hardware state. This effectively reduces the amount of information to be handled when threads are swapped in the processor. During the course of a thread's execution, at the first instance of an attempt by the thread to execute a floating point instruction, the "float-unavailable" exception occurs. This, in turn, invokes the microkernel's floating point exception handler. The function of this exception handler is to make floating point available to the thread that requires it. The exception handler dynamically allocates space for saving the thread's floating point registers, initializes the registers, and turns on the "float-available" bit in its machine state register. Once a thread obtains floating point context, it continues to have it for the remainder of its life.

6 Claims, 10 Drawing Sheets

FIG. 1A

| 64-bit implementations | | 32-bit implementations |
|---|---|---|
| CR<br>0    31 | Condition Register | CR<br>0    31 |
| LR<br>0              63 | Link Register | LR<br>0    31 |
| CTR<br>0              63 | Count Register | CTR<br>0    31 |
| GPR 00<br>GPR 01<br>...<br>GPR 31<br>0              63 | General Purpose Registers | GPR 00<br>GPR 01<br>...<br>GPR 31<br>0    31 |
| XER<br>0    31 | Fixed-Point Exception Register | XER<br>0    31 |
| FPR 00<br>FPR 01<br>...<br>FPR 31<br>0              63 | Floating-Point Registers | FPR 00<br>FPR 01<br>...<br>FPR 31<br>0              63 |
| FPSCR<br>0    31 | Floating-Point Status and Control Register | FPSCR<br>0    31 |

FIG. 2   FIRST LEVEL INTERRUPT HANDLER

| I) USING THE SPECIAL PURPOSE REGISTERS, SPRG0-SPRG1, GPR2 AND GPR3 ARE SAVED. |

↓

| II) GPR3 IS SET TO THE PHYSICAL ADDRESS OF CPU_VAR STRUCTURE. |

↓

| III) GPR2 IS SET TO VM_KERNEL_PHYS_SEG UPPER TO BE USED BY FLIH_PANIC. |

↓

| IV) GPR4 AND GPR5 ARE SAVED INTO THE CPU_VAR'S SCRATCH FAST SAVE AREA. |

↓

| V) SAVE SRR0 AND SRR1 IN GPR4 AND GPR5 |

↓

| VI) PREPARE FOR AND JUMP TO HIGH MEMORY. NOTE THAT CALL_SLIH IS IN VIRTUAL HIGH MEMORY. |

↓

| VII) GPR2 IS SET TO THE TOC OFFSET OF CALL_SLIH FROM THE CPU_VARS STRUCTURE. |

↓

| VIII) SRR0 (I. E) IAR IS SET TO THE VALUE OF GPR2. |

↓

| IX) GPR3 IS SET TO THE ADDRESS OF THE SAVE STATE AREA. |

↓

| X) TRANSLATIONS ENABLED. I. E SRR1 IS SET TO MSR_IR AND MSR_DR. |

↓

| XI) GPR2 IS SET TO THE ACTUAL SLIH ENTRY TOC OFFSET. |

↓

| XII) PERFORM AN RFI. |

FIG. 3

PRE-SECOND LEVEL INTERRUPT HANDLER (CALL_SLIH()).

I)   SAVE THE REST OF THE MACHINE STATE TO THE STATE SAVE AREA IN THE CPU_VARS STRUCTURE.
   THE TOC REGISTER HAS BEEN INITIALIZED. GPR2 HAS KERNEL TOC.
   ALL THE STATE HAS BEEN SAVED INTO THE PPC SAVE STATE,
   STRUCTURE POINTED TO BY GPR3.
   GPR4 CONTAINS THE VALUE OF SRR1 (OLD MSR)
   GPR5 CONTAINS THE VALUE OF DSISR
   GPR6 CONTAINS THE VALUE OF DAR
   GPR7 CPU_VARS POINTER
   GPR10 CONTAINS THE SLIH TOC ENTRY POINT.

V

II)   EXAMINE MSR[PR] BIT TO DETERMINE IF THIS EXCEPTION CAUSED A USER-TO-KERNEL OR KERNEL TO KERNEL TRANSITION TO KNOW WHETHER THE KERNEL STACK TO BE RESTORED IN R1 AND CHOOSE THE APPROPRIATE EXIT ROUTINE TO RETURN. IF THE PR BIT WAS SET TO 1, THE ADDRESS OF LOAD_AND_GO_USER IS LOADED INTO THE GPR14. OTHERWISE LOAD R1 TO POINT TO THE KERNEL STACK FROM CPU_VARS STRUCTURE POINTED TO BY GPR7.

V

III)   ALLOCATE NEW PPC_SAVED_STATE AREA ON THE KERNEL STACK AND BACK CHAIN IT TO THE PREVIOUS PPC_SAVED_STATE ON THE LIST.

V

IV)   UPDATE THE NEXT POINTER CV_NEXT_RSS IN THE RSS CHAIN TO POINT TO THE NEW PPC_SAVED_STATE IN THE CPU_VARS STRUCTURE.

V

V)   ALLOCATE A C FRAME ON THE STACK AND NULL BACK CHAIN IT.

V

VI)   LOAD GPR13 WITH THE PPC_SAVED_STATE CURRENTLY IN GPR3. (GPR13 BEING NON VOLATILE AND GPR3 IS NOT NON-VOLATILE ACCORDING TO LINKAGE CONVENTIONS)

V

VII)   MOVE GPR10 TO COUNTER REGISTER. NOW THE COUNTER REGISTER SHOULD HAVE ADDRESS TO SLIH.

V

VIII)   BRANCH THROUGH THE COUNT REGISTER TO THE SLIH.

FIG. 4

SECOND LEVEL INTERRUPT HANDLER (SLIH).

THE SLIH IS GENERALLY A 'C' ROUTINE THAT ACTUALLY HANDLES THE EXCEPTION AND RETURNS. IT IS ENTIRELY LEFT TO THE DISCRETION OF THE SLIH TO HAVE THE EXTERNAL INTERRUPTS RE-ENABLED WHILE THEY ARE EXECUTING. THE SLIH WILL NOT RETURN TO THE CALL_SLIH() ROUTINE BECAUSE CALL_SLIH() LOADED THE CORRECT EXIT ROUTINE IN THE LINK REGISTER PRIOR TO CALLING THE SLIH.

FIG. 5

EXIT HANDLER.

| I) DISABLE EXTERNAL INTERRUPTS. |

V

| II) IF RETURNING TO USER MODE, CHECK THE GLOBAL VARIABLE NEED_AST. IF SET, RE-ENABLE EXTERNAL INTERRUPTS AND CALL THE AST HANDLER,AST(). WHEN DONE, RETURN TO THE TOP OF EXIT HANDLER LOAD_AND_GO_USER(). |

V

| III) BAT3 IS ENABLED, ESTABLISHING A VIRTUAL EQUALS REAL MAPPING FOR LOW MEMORY. TO TURN OFF TRANSLATIONS, THE KERNEL MUST BE EXECUTING IN LOW MEMORY. A MAPPING OF LOW MEMORY MUST BE PRESENT TO DO THE JUMP. |

V

| IV) STORE CURRENT PPC_SAVED_STATE TO THE PER CPU VARIABLE CV_NEXT_RSS. THIS CAUSES THE CURRENT PPC_SAVED_STATE AREA TO BE RE-USED ON THE NEXT EXCEPTION. |

V

| V) RESTORE TWO REGISTERS TEMPORARILY IN TWO SPRS SO THAT THERE IS ROOM TO STORE SRR0 AND SRR1. |

V

| VI) PUT THE PHYSICAL ADDRESS OF SCRATCH SAVE AREA/CPU_VARS INTO R1 |

V

| VII) RESTORE THE REMAINING MACHINE STATE. |

V

| VIII) JUMP DOWN TO LOW MEMORY. HERE IT JUMPS TO PHYSICAL ADDRESS 0X3000 WHERE THE LOW_ADDRESS_RFI() IS. THIS ROUTINE DOES THE FOLLOWING<br>    DISABLE TRANSLATIONS.<br>    RESTORE SRR0 AND SRR1 FROM THE SCRATCH REGISTERS.<br>    RESTORE THE TWO SCRATCH REGISTERS FROM THE SPECIAL PURPOSE REGISTERS.<br>    RFI - RETURN FROM INTERRUPT |

FLOATING POINT EXCEPTION HANDLER 192

FIG. 7

FPSCR Register

| FX | FEX | VX | OX | UX | ZX | XX | VX SNAN | VX ISI | VX IDI | VX ZDZ | VX IMZ | VX VC | FR | FI | FPRF | Reserved | VX SOFT | VX SQRT | VX CVI | VE | OE | UE | ZE | XE | Reserved | RN |
|---|---|---|---|---|---|---|---|---|---|---|---|---|---|---|---|---|---|---|---|---|---|---|---|---|---|---|

ALIGNMENT EXCEPTION HANDLER 194

1) ENTRY AT PHYSICAL ADDRESS 0X600.

2) TEMPORARILY SAVE A WORK REGISTER INTO SPR_G0.

3) GET ADDRESS OF CPU_VARS. FH_SAVE_AREA FROM THE SPR_CPU REGISTER.

4) CONVERT VIRTUAL ADDRESS OF FH_SAVE_AREA INTO A PHYSICAL ADDRESS.

5) SAVE REGISTERS USED OR AFFECTED BY EXCEPTION HANDLER (GPR25 THROUGH GPR31, LR, CR, XER, SRR0, AND SRR1).

6) MOVE COPIES OF DSISR, DAR, AND MSR INTO WORK REGISTERS.

7) ASSERT THAT PROCESSOR WAS IN PROBLEM MODE AT TIME OF EXCEPTION.

8) CHECK ADDRESS BOUNDS OF OPERATION AGAINST KERNEL VIRTUAL ADDRESS SPACE.

9) MOVE DSISR INTO CR FOR BIT TESTS.

10) BRANCH INTO INSTRUCTION DECODE (DSISR) TABLE BASED ON DSISR[15-21]

11) EXECUTE APPROPRIATE SUBMODULE (SUBMODULE DESCRIPTIONS ARE GIVEN IN THE FOLLOWING SUBMODULES SECTION)

12) RESTORE SAVED STATE AND RETURN TO USER MODE.

EXCEPTION HANDLING METHOD AND APPARATUS FOR A MICROKERNEL DATA PROCESSING SYSTEM

FIELD OF THE INVENTION

The invention disclosed broadly relates to data processing systems and more particularly relates to improvements in operating systems for data processing systems.

RELATED PATENT APPLICATIONS

The invention disclosed herein is related to the copending United States Patent Application by Guy G. Sotomayor, Jr., James M. Magee, and Freeman L. Rawson, III, which is entitled "METHOD AND APPARATUS FOR MANAGEMENT OF MAPPED AND UNMAPPED REGIONS OF MEMORY IN A MICROKERNEL DATA PROCESSING SYSTEM", Ser. No. 263,710, filed Jun. 21, 1994, IBM Docket Number BC9-94-053, assigned to the International Business Machines Corporation, and incorporated herein by reference.

The invention disclosed herein is also related to the copending United States Patent Application by James M. Magee, et al. which is entitled "CAPABILITY ENGINE METHOD AND APPARATUS FOR A MICROKERNEL DATA PROCESSING SYSTEM", Ser. No. 263,313, filed Jun. 21,1994, IBM Docket Number BC9-94-071, assigned to the International Business Machines Corporation, and incorporated herein by reference.

The invention disclosed herein is also related to the copending United States Patent Application by James M. Magee, et al. which is entitled "TEMPORARY DATA METHOD AND APPARATUS FOR A MICROKERNEL DATA PROCESSING SYSTEM", Ser. No. 263,633, filed Jun. 21, 1994, IBM Docket Number BC9-94-076, assigned to the International Business Machines Corporation, and incorporated herein by reference.

The invention disclosed herein is also related to the copending United States Patent Application by James M. Magee, et al. which is entitled "MESSAGE CONTROL STRUCTURE REGISTRATION METHOD AND APPARATUS FOR A MICROKERNEL DATA PROCESSING SYSTEM", Ser. No. 263,703, filed Jun. 21, 1994, IBM Docket Number BC9-94-077, assigned to the International Business Machines Corporation, and incorporated herein by reference.

The invention disclosed herein is also related to the copending United States Patent Application by James M. Magee, et al. which is entitled "ANONYMOUS REPLY PORT METHOD AND APPARATUS FOR A MICROKERNEL DATA PROCESSING SYSTEM", Ser. No. 263,709, filed Jun. 21, 1994, IBM Docket Number BC9-94-080, assigned to the International Business Machines Corporation, and incorporated herein by reference.

The invention disclosed herein is also related to the copending United States Patent Application by Aziza Bushra Faruqi, et al. which is entitled "SEPARATION OF TRANSMISSION CONTROL METHOD AND APPARATUS FOR A MICROKERNEL DATA PROCESSING SYSTEM", Ser. No. 08/281,217, filed Jul. 27, 1994, IBM Docket Number BC9-94-081XX, assigned to the International Business Machines Corporation, and incorporated herein by reference.

The invention disclosed herein is also related to the copending United States Patent Application by Ram K. Gupta, Ravi Srinivasan, Dennis Ackerman, and Himanshu Desai which is entitled "PAGE TABLE ENTRY MANAGEMENT METHOD AND APPARATUS FOR A MICROKERNEL DATA PROCESSING SYSTEM", Ser. No. 08/303,005, filed Sep. 9, 1994, IBM Docket Number BC9-94-073, assigned to the International Business Machines Corporation, and incorporated herein by reference.

BACKGROUND OF THE INVENTION

The operating system is the most important software running on a computer. Every general purpose computer must have an operating system to run other programs. Operating systems typically perform basic tasks, such as recognizing input from the keyboard, sending output to the display screen, keeping track of files and directories on the disc, and controlling peripheral devices such as disc drives and printers. For more complex systems, the operating system has even greater responsibilities and powers. It makes sure that different programs and users running at the same time do not interfere with each other. The operating system is also typically responsible for security, ensuring that unauthorized users do not access the system.

Operating systems can be classified as multi-user operating systems, multi-processor operating systems, multi-tasking operating systems, and real-time operating systems. A multi-user operating system allows two or more users to run programs at the same time. Some operating systems permit hundreds or even thousands of concurrent users. A multi-processing program allows a single user to run two or more programs at the same time. Each program being executed is called a process. Most multi-processing systems support more than one user. A multi-tasking system allows a single process to run more than one task. In common terminology, the terms multi-tasking and multi-processing are often used interchangeably even though they have slightly different meanings. Multi-tasking is the ability to execute more than one task at the same time, a task being a program. In multi-tasking, only one central processing unit is involved, but it switches from one program to another so quickly that it gives the appearance of executing all of the programs at the same time. There are two basic types of multi-tasking, preemptive and cooperative. In preemptive multi-tasking, the operating system parcels out CPU time slices to each program. In cooperative multi-tasking, each program can control the CPU for as long as it needs it. If a program is not using the CPU however, it can allow another program to use it temporarily. For example, the OS/2 (TM) and UNIX (TM) operating systems use preemptive multi-tasking, whereas the Multi-Finder (TM) operating system for Macintosh (TM) computers uses cooperative multi-tasking. Multi-processing refers to a computer system's ability to support more than one process or program at the same time. Multi-processing operating systems enable several programs to run concurrently. Multi-processing systems are much more complicated than single-process systems because the operating system must allocate resources to competing processes in a reasonable manner. A real-time operating system responds to input instantaneously. General purpose operating systems such as DOS and UNIX are not real-time.

Operating systems provide a software platform on top of which application programs can run. The application programs must be specifically written to run on top of a particular operating system. The choice of the operating system therefore determines to a great extent the applications which can be run. For IBM compatible personal computers, example operating systems are DOS, OS/2 (TM), AIX (TM), and XENIX (TM).

A user normally interacts with the operating system through a set of commands. For example, the DOS operating system contains commands such as COPY and RENAME for copying files and changing the names of files, respectively. The commands are accepted and executed by a part of the operating system called the command processor or command line interpreter.

There are many different operating systems for personal computers such as CP/M (TM), DOS, OS/2 (TM), UNIX (TM), XENIX (TM), and AIX (TM). CP/M was one of the first operating systems for small computers. CP/M was initially used on a wide variety of personal computers, but it was eventually overshadowed by DOS. DOS runs on all IBM compatible personal computers and is a single user, single tasking operating system. OS/2, a successor to DOS, is a relatively powerful operating system that runs on IBM compatible personal computers that use the Intel 80286 or later microprocessor. OS/2 is generally compatible with DOS but contains many additional features, for example it is multi-tasking and supports virtual memory. UNIX and UNIX-based AIX run on a wide variety of personal computers and work stations. UNIX and AIX have become standard operating systems for work stations and are powerful multi-user, multiprocessing operating systems.

In 1981 when the IBM personal computer was introduced in the United States, the DOS operating system occupied approximately 10 kilobytes of storage. Since that time, personal computers have become much more complex and require much larger operating systems. Today, for example, the OS/2 operating system for the IBM personal computers can occupy as much as 22 megabytes of storage. Personal computers become ever more complex and powerful as time goes by and it is apparent that the operating systems cannot continually increase in size and complexity without imposing a significant storage penalty on the storage devices associated with those systems.

It was because of this untenable growth rate in operating system size, that the MACH project was conducted at the Carnegie Mellon University in the 1980's. The goal of that research was to develop a new operating system that would allow computer programmers to exploit modern hardware architectures emerging and yet reduce the size and the number of features in the kernel operating system. The kernel is the part of an operating system that performs basic functions such as allocating hardware resources. In the case of the MACH kernel, five programming abstractions were established as the basic building blocks for the system. They were chosen as the minimum necessary to produce a useful system on top of which the typical complex operations could be built externally to the kernel. The Carnegie Mellon MACH kernel was reduced in size in its release 3.0, and is a fully functional operating system called the MACH microkernel. The MACH microkernel has the following primitives: the task, the thread, the port, the message, and the memory object.

The traditional UNIX process is divided into two separate components in the MACH microkernel. The first component is the task, which contains all of the resources for a group of cooperating entities. Examples of resources in a task are virtual memory and communications ports. A task is a passive collection of resources; it does not run on a processor.

The thread is the second component of the UNIX process, and is the active execution environment. Each task may support one or more concurrently executing computations called threads. For example, a multi-threaded program may use one thread to compute scientific calculations while another thread monitors the user interface. A MACH task may have many threads of execution, all running simultaneously. Much of the power of the MACH programming model comes from the fact that all threads in a task share the task's resources. For instance, they all have the same virtual memory (VM) address space. However, each thread in a task has its own private execution state. This state consists of a set of registers, such as general purpose registers, a stack pointer, a program counter, and a frame pointer.

A port is the communications channel through which threads communicate with each other. A port is a resource and is owned by a task. A thread gains access to a port by virtue of belonging to a task. Cooperating programs may allow threads from one task to gain access to ports in another task. An important feature is that they are location transparent. This capability facilitates the distribution of services over a network without program modification.

The message is used to enable threads in different tasks to communicate with each other. A message contains collections of data which are given classes or types. This data can range from program specific data such as numbers or strings to MACH related data such as transferring capabilities of a port from one task to another.

A memory object is an abstraction which supports the capability to perform traditional operating system functions in user level programs, a key feature of the MACH microkernel. For example, the MACH microkernel supports virtual memory paging policy in a user level program. Memory objects are an abstraction to support this capability.

All of these concepts are fundamental to the MACH microkernel programming model and are used in the kernel itself. These concepts and other features of the Carnegie Mellon University MACH microkernel are described in the book by Joseph Boykin, et al, "Programming Under MACH", Addison Wessely Publishing Company, Incorporated, 1993.

Additional discussions of the use of a microkernel to support a UNIX personality can be found in the article by Mike Accetta, et al, "MACH: A New Kernel Foundation for UNIX Development", Proceedings of the Summer 1986 USENIX Conference, Atlanta, Ga. Another technical article on the topic is by David Golub, et al, "UNIX as an Application Program", Proceedings of the Summer 1990 USENIX Conference, Anaheim, Calif.

The above cited, copending patent application by Guy G. Sotomayor, Jr., James M. Magee, and Freeman L. Rawson, III, describes the microkernel system 115 shown in FIG. 1, which is a new foundation for operating systems. The microkernel system 115 provides a concise set of kernel services implemented as a pure kernel and an extensive set of services for building operating system personalities implemented as a set of user-level servers. The microkernel system 115 is made up of many server components that provide the various traditional operating system functions and that are manifested as operating system personalities. The microkernel system 115 uses a client/server system structure in which tasks (clients) access services by making requests of other tasks (servers) through messages sent over a communication channel. Since the microkernel 120 provides very few services of its own (for example, it provides no file service), a microkernel 120 task must communicate with many other tasks that provide the required services.

The microkernel system 115 has, as its primary responsibility, the provision of points of control that execute instructions within a framework. In the microkernel 120, points of control are the threads, that execute in a virtual environment. The virtual environment provided by the microkernel 120 consists of a virtual processor that executes all of the user space accessible hardware instructions, augmented by emulated instructions (system traps) provided by the kernel; the virtual processor accesses a set of virtualized registers and some virtual memory that otherwise responds as does the machine's physical memory. All other hardware resources are accessible only through special combinations of memory accesses and emulated instructions. Of course, it is a physical processor that actually executes the instructions represented by the threads.

Each physical processor that is capable of executing threads is named by a processor control port. Although significant in that they perform the real work, processors are not very significant in the microkernel, other than as members of a processor set. It is a processor set that forms the basis for the pool of processors used to schedule a set of threads, and that has scheduling attributes associated with it. The operations supported for processors include assignment to a processor set and machine control, such as start and stop.

One advanced technology processor that can take full advantage of the capabilities of the Microkernel System 115 is the PowerPC (TM). The PowerPC is an advanced RISC (reduced instruction set computer) architecture, described in the book: IBM Corporation, "The PowerPC Architecture", Morgan-Kaufmann, San Francisco, 1994. Another description of the PowerPC is provided in the article: Keith Diefendorff, Rich Oehler, and Ron Hochsprung, "Evolution of the PowerPC Architecture", IEEE Micro, April 1994, pp. 34–49. The PowerPC was designed with its architecture divided into three parts or "books." Book 1 deals with those features that will not change over time, such as the user instruction set architecture, instruction definitions, opcode assignments, register definitions, etc. Book 2 deals with those features important to the operation of the processor in a multiprocessing environment, such as the memory model, consistency, atomicity and aliasing. Book 3 deals with the operating environment architecture. These are features that are not directly visible to the user, but instead are the exclusive domain of the operating system. Within this part of the architecture is the definition of the virtual-to-physical address translation and the method of exception handling. Because Book 3 features are supervisor privileged, it is possible to design a PowerPC processor according to an entirely different set of Book 3 features, and yet maintain user application compatibility.

However, there are several problems in adapting the microkernel 120 to the PowerPC processor. The microkernel 120, while scheduling threads of tasks running on the system, has to save the context of the currently running thread on the processor and restore the context of the thread that needs to start its execution. The context of a program is the environment (e.g., privilege and relocation) in which the program executes. That context is controlled by the content of certain system registers and the address translation tables. Since the floating point hardware in PowerPC processors includes 32 floating point registers 64 bits long, and a 32 bit floating point status and control register, it is very inefficient to have the threads assume the entire hardware for their context when they are created. Such an approach leads to an expensive context switch even when the threads do not need floating point capability.

OBJECTS OF THE INVENTION

It is therefore an object of the invention to provide improved efficiency in the operation of a processor running a microkernel operating system.

It is another object of the invention to provide improved speed in the operation of a processor in a microkernel architecture.

It is a further object of the invention to provide improved multiprocessor support for a PowerPC processor running a microkernel operating system.

SUMMARY OF THE INVENTION

These and other objects, features and advantages are accomplished by the exception handling method and apparatus disclosed herein. The floating point exception problem is solved by the lazy context restore feature of the exception handling invention.

The invention begins by creating a thread in the memory without the floating point context indication in the thread's process control block (pcb). In accordance with the invention, this will prevent the copying of the floating point registers of the processor on which the thread has been running, when its execution is terminated after a fault or interrupt.

While executing during a first occurring session, only fixed point (integer) operations will be carried out by the thread in the processor using the plurality of fixed point registers of the processor.

When a fault or an interrupt occurs terminating the first session (context switch time), the thread is removed from execution in the processor and the contents of the fixed point registers are stored in the thread's process control block. In response to the stored indication of no floating point context, the contents of the plurality of floating point registers in the processor are not stored in the thread's process control block. This significantly improves the overall performance of the system.

Later, when the thread's execution is restored during a second occurring session, either in the same processor, or in an alternate processor, the contents of the process control block are examined to determine the state of the floating point context indication. Since the indication is that the thread does not have the floating point context, only fixed point operations are to be carried out with the thread in the processor using the plurality of fixed point registers. Thus, there is no attempt to copy back from the thread's process control block, values to load into the processor's floating point registers. This provides is a significant improvement in the overall performance of the system.

If the sequence of program instructions being run by the thread attempts to execute a floating point instruction during the second session, the floating point exception handler is called.

The exception handler stores an alternate indication in the processor's machine state register, that the floating point context is available for the thread. This enables the thread to perform floating point operations. The thread then resumes execution of the floating point instruction in the processor.

If another fault or interrupt occurs, forcing a termination of the execution of the thread in the processor (context switch time), the thread is removed from the processor, terminating the second session. This time, the contents of both the plurality of fixed point registers and the plurality of floating point registers in the processor are stored in the thread's process control block in response to the alternate indication in the machine state register, that it is enabled for floating point operations. The alternate indication in the machine state register of the processor is also copied into the thread's process control block. Thus, only those threads that are performing floating point operations have the floating point registers copied at the termination of the thread's execution session in the processor.

Later, when the thread's execution is restored in during a third occurring session, either in the same processor, or in an alternate processor, the contents of the process control block are examined to determine the state of the floating point context indication. Since the indication is that the thread does have the floating point context, both floating point and fixed point operations are to be carried out with the thread in the processor using the plurality of floating point and fixed point registers. Thus, the microkernel copies back from the thread's process control block, values to load into the processor's floating point registers, in addition to the values to load into the processor's fixed point registers. The microkernel also copies back from the thread's process control block the floating point context indication, which it loads in the processor's machine state register. Thus, only those threads that are performing floating point operations have values copied out of their process control blocks to load into the processor's floating point registers at the restoration of execution of the threads in the processor.

The invention has the following advantages:

a. Context switch duration is greatly reduced if an application has threads that do not need their floating point registers saved, since floating point hardware is only made available to a thread on demand.

b. Since the entire context of the thread is saved in its process control block once it obtains floating point capability, a thread can be scheduled across multiple processors in a symmetric multiprocessing implementation of the microkernel.

In this manner, the exception handling method and apparatus provides improved efficiency in the operation of a processor running a microkernel operating system.

In an alternate embodiment of the invention, if a processor has only one thread executing within it that has the floating point context, then the contents of that processor's floating point registers do not need to be saved when that thread is removed from the processor. If all other threads executing within that processor are not using the floating point registers, the values loaded into those registers by the sole floating point thread remain untouched. In accordance with the invention, each processor maintains a data structure in the memory that stores the name of the sole floating point thread that is executing in the respective processor. Then, when a second thread having a floating point context is to begin execution in the processor, the processor calls the floating point exception handler. The floating point exception handler then copies the contents of the processor's floating point registers, gets the name of first thread from the data structure, and saves the copied values in the process control block for the named first thread. Then the second thread can begin execution in the processor, and can load its own values into the processor's floating point registers. In this manner, the contents of the floating point registers of the processor need not be saved at all, if there is only one floating point thread executing in that processor.

For multiprocessor configurations, when the first thread is to resume execution in a different processor, the floating point exception handler is called to copy the contents of the floating point registers of the first processor, to those of the second processor, if the first thread was the sole floating point thread that was executing in the first processor.

BRIEF DESCRIPTION OF THE DRAWING(S)

These and other objects features and advantages will be more fully appreciated with reference to the accompanying figures.

FIG. 1 is a functional block diagram of the Microkernel System 115 in the memory 102 of the host multiprocessor 100, showing how the microkernel and personality-neutral services 140 run multiple operating system personalities on a variety of hardware platforms, including the PowerPC processor.

FIG. 2 shows a flow diagram of the first level interrupt handler, which is part of the PowerPC exception handler 190.

FIG. 3 shows a flow diagram of the pre-second level interrupt handler, which is part of the PowerPC exception handler 190.

FIG. 4 shows a flow diagram of the second level interrupt handler, which is part of the PowerPC exception handler 190.

FIG. 5 shows a flow diagram of the exit handler, which is part of the PowerPC exception handler 190.

FIG. 7 shows a layout of the floating point status and control register.

FIG. 8 shows a flow diagram of the alignment exception handler 194, which is part of the PowerPC exception handler 190.

DESCRIPTICON OF THE ILLUSTRATIVE EMBODIMENT(S)

Part A. The Microkernel System

Section 1. Microkernel Principles

Figure 1:
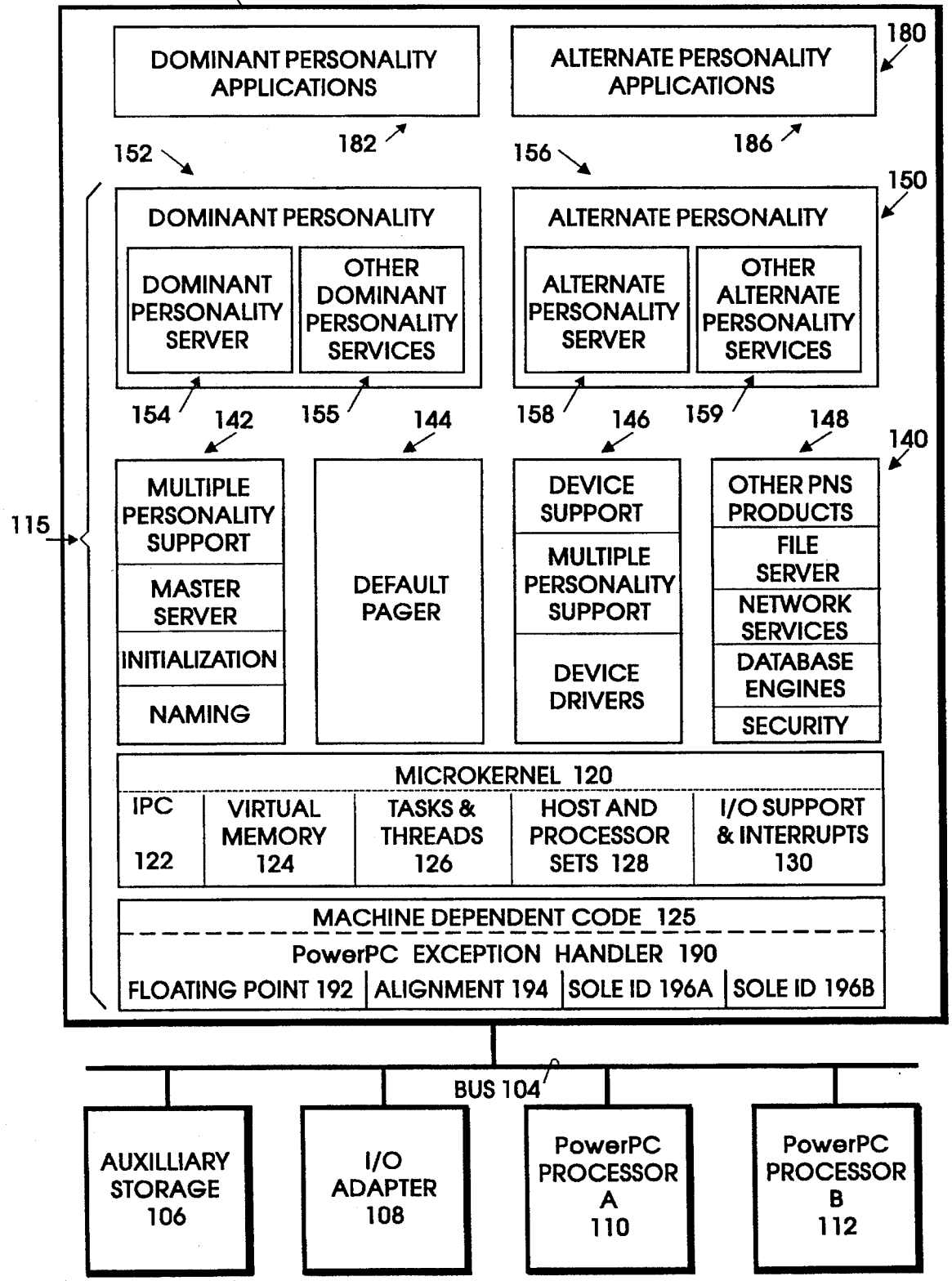
FIG. 1A shows the PowerPC user register set.
FIG. 1B shows the major parts of the PowerPC exception handler 190.

FIG. 1 is a functional block diagram of the Microkernel System 115, showing how the microkernel 120 and personality-neutral services 140 run multiple operating system personalities 150 on a variety of hardware platforms.

The host multi-processor 100 shown in FIG. 1 includes memory 102 connected by means of a bus 104 to an auxiliary storage 106 which can be for example a disc drive, a read only or a read/write optical storage, or any other bulk storage device. Also connected to the bus 104 is the I/O adaptor 108 which in turn may be connected to a keyboard, a monitor display, a telecommunications adaptor, a local area network adaptor, a modem, multimedia interface devices, or other I/O devices. Also connected to the bus 104 is a first processor A, 110 and a second processor B, 112. The processors 110 and 112 are PowerPC (TM) processors, as described above. The example shown in FIG. 1 is of a symmetrical multi-processor configuration wherein the two uni-processors 110 and 112 share a common memory address space 102. Other configurations of single or multiple processors can be shown as equally suitable examples. The processors can be other types, for example, an Intel 386 (TM) CPU, Intel 486 (TM) CPU, a Pentium (TM) processor, or other uni-processor devices.

The memory 102 includes the microkernel system 115 stored therein, which comprises the microkernel 120, the machine dependent code 125, the personality neutral services (PNS) 140, and the personality servers 150. In accordance with the invention, the machine dependent code 125 includes the PowerPC exception handler 190. Included in the PowerPC exception handler 190 is the floating point exception handler 192 and the alignment exception handler 194. Each processor maintains a data structure 196A for processor A 110 and data structure 196B for processor A 112 in the memory 102 of FIG. 1. The data structure 196A stores the name of the sole floating point thread that is executing in the respective processor A 110. Similarly, the data structure 196B stores the name of the sole floating point thread that is executing in the respective processor B 112. The microkernel system 115 serves as the operating system for the application programs 180 stored in the memory 102.

An objective of the invention is to provide an operating system that behaves like a traditional operating system such as UNIX or OS/2. In other words, the operating system will have the personality of OS/2 or UNIX, or some other traditional operating system.

The microkernel 120 contains a small, message-passing nucleus of system software running in the most privileged state of the host multi-processor 100, that controls the basic operation of the machine. The microkernel system 115 includes the microkernel 120 and a set of servers and device drivers that provide personality neutral services 140. As the name implies, the personality neutral servers and device drivers are not dependent on any personality such as UNIX or OS/2. They depend on the microkernel 120 and upon each other. The personality servers 150 use the message passing services of the microkernel 120 to communicate with the personality neutral services 140. For example, UNIX, OS/2 or any other personality server can send a message to a personality neutral disc driver and ask it to read a block of data from the disc. The disc driver reads the block and returns it in a message. The message system is optimized so that large amounts of data are transferred rapidly by manipulating pointers; the data itself is not copied.

By virtue of its size and ability to support standard programming services and features as application programs, the microkernel 120 is simpler than a standard operating system. The microkernel system 115 is broken down into modular pieces that are configured in a variety of ways, permitting larger systems to be built by adding pieces to the smaller ones. For example, each personality neutral server 140 is logically separate and can be configured in a variety of ways. Each server runs as an application program and can be debugged using application debuggers. Each server runs in a separate task and errors in the server are confined to that task.

FIG. 1 shows the microkernel 120 including the interprocess communications module (IPC) 122, the virtual memory module 124, tasks and threads module 126, the host and processor sets 128, I/O support and interrupts 130, and machine dependent code 125.

The personality neutral services 140 shown in FIG. 1 includes the multiple personality support 142 which includes the master server, initialization, and naming. It also includes the default pager 144. It also includes the device support 146 which includes multiple personality support and device drivers. It also includes other personality neutral products 148, including a file server, network services, database engines and security.

The personality servers 150 are for example the dominant personality 152 which can be, for example, a UNIX personality. It includes a dominant personality server 154 which would be a UNIX server, and other dominant personality services 155 which would support the UNIX dominant personality. An alternate dominant personality 156 can be for example OS/2. Included in the alternate personality 156 are the alternate personality server 158 which would characterize the OS/2 personality, and other alternate personality services for OS/2, 159.

Dominant personality applications 182 shown in FIG. 1, associated with the UNIX dominant personality example, are UNIX-type applications which would run on top of the UNIX operating system personality 152. The alternate personality applications 186 shown in FIG. 1, are OS/2 applications which run on top of the OS/2 alternate personality operating system 156.

FIG. 1 shows that the Microkernel System 115 carefully splits its implementation into code that is completely portable from processor type to processor type and code that is dependent on the type of processor in the particular machine on which it is executing. It also segregates the code that depends on devices into device drivers; however, the device driver code, while device dependent, is not necessarily dependent on the processor architecture. Using multiple threads per task, it provides an application environment that permits the use of multi-processors without requiring that any particular machine be a multi-processor. On uni-processors, different threads run at different times. All of the support needed for multiple processors is concentrated into the small and simple microkernel 120.

The above cited patent applications provide a more detailed description of the Microkernel System 115, including the architectural model, tasks, threads, ports, and interprocess communications, and features of the microkernel 120. The virtual environment provided by the microkernel 120 consists of a virtual processor that executes all of the user space accessible hardware instructions, augmented by emulated instructions (system traps) provided by the kernel; the virtual processor accesses a set of virtualized registers and some virtual memory that otherwise responds as does the machine's physical memory. All other hardware resources are accessible only through special combinations of memory accesses and emulated instructions. Of course, it is a physical processor that actually executes the instructions represented by the threads.

Each physical processor that is capable of executing threads is named by a processor control port. Although significant in that they perform the real work, processors are not very significant in the microkernel, other than as members of a processor set. It is a processor set that forms the basis for the pool of processors used to schedule a set of threads, and that has scheduling attributes associated with it. The operations supported for processors include assignment to a processor set and machine control, such as start and stop.

FIG. 1 shows the PowerPC as the processor 110 and 112. The PowerPC, as described above, is an advanced RISC (reduced instruction set computer) architecture, described in the book: IBM Corporation, "The PowerPC Architecture", Morgan-Kaufmann, San Francisco, 1994. Another description of the PowerPC is provided in the article: Keith Diefendorff, Rich Qehler, and Ron Hochsprung, "Evolution of the PowerPC Architecture", IEEE Micro, April 1994, pp. 34–49.

FIG. 1A shows the PowerPC user register set, including the condition register CR, the link register LR, the count register CTR, the 32 general purpose registers GPR00 to GPR31, the fixed point exception register XER, the 32 floating point registers FPR00 to FPR31, and the floating point status and control register FPSCR.

An exception is an error, unusual condition, or external signal, that may set a status bit and may or may not cause an interrupt, depending upon whether or not the corresponding interrupt is enabled.

Figure 1B:
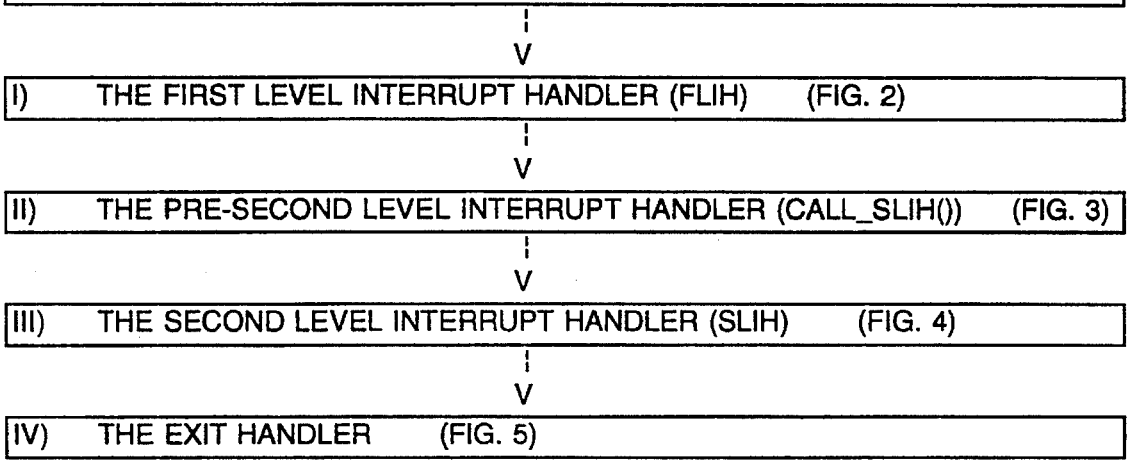

To transparently process an exception, the machine state must be saved, the exception fully decoded, the exception handled, the machine state restored and control returned to where the exception occurred. There are four levels of exception processing in the PowerPC exception handler 190, as shown in FIG. 1B.

i) the first level interrupt handler (FLIH) of FIG. 2.

ii) the pre-second level interrupt handler ($call_{13}$ slih( )) of FIG. 3.

iii) the second level interrupt handler (SLIH) of FIG. 4.

iv) the exit handler of FIG. 5.

Processing for most exceptions do conform to the above-mentioned four-step approach. However few exceptions require to be processed as quickly as possible in order that the overall system performance does not get affected. One of such exceptions is alignment related and is discussed in detail in subsequent sections.

Exception Processing Steps

This section dwells on the details involved in the four levels of exception processing. Although most of the exceptions on the PowerPC are processed this way, few exceptions owing to their very nature and performance reasons are not handled strictly according to the general four step processing model.

First Level Interrupt Handler is shown in the flow diagram of FIG. 2, which is part of the PowerPC exception handler 190.

The FLIH is responsible for all the low-level machine setup so that the kernel can run. This includes turning on translations and jumping to high memory. The FLIH must do any decoding of the exception to completely define and load it into a common location so that the next handler will know what routines to call.

The flow diagram of FIG. 2 has the following steps:

i) using the special purpose registers, SPRG0-SPRG1, GPR2 and GPR3 are saved.

ii) GPR3 is set to the physical address of $CPU_{13}$ VAR structure.

iii) GPR2 is set to $VM_{13}$ $KERNEL_{13}$ $PHYS_{13}$ SEG upper to be used by $FLIH_{13}$ PANIC.

iv) GPR4 and GPR5 are saved into the $CPU_{13}$ VAR's scratch fast save area.

v) save SRR0 and SRR1 in GPR4 and GPR5 vi) prepare for and jump to high memory. Note that $call_{13}$ slih is in virtual high memory.

vii) GPR2 is set to the TOC offset of $call_{13}$ slih from the $CPU_{13}$ VARS structure.

viii) SRR0 (i.e) IAR is set to the value of GPR2.

ix) GPR3 is set to the address of the save state area.

x) translations enabled. i. e SRR1 is set to $MSR_{13}$ IR and $MSR_{13}$ DR.

xi) GPR2 is set to the actual SLIH entry TOC offset.

xii) perform an rfi.

FIG. 3 is a flow diagram of The Pre-Second Level Interrupt Handler ($call_{13}$ slih( )), which is part of the PowerPC exception handler 190.

This routine has no knowledge of what exception has occured. Its purpose is to save any remaining state and do the common stack manipulations prior to calling the SLIH. The $call_{13}$ slih( ) routine determines whether the stack currently pointed to by r1 is a kernel stack. Once a kernel stack is guaranteed to be in r1, $call_{13}$ slih( ) allocates a $ppc_{13}$ $saved_{13}$ state and a c-frame on the stack. The $call_{13}$ slih( ) then branches to the address of SLIH saved by the FLIH.

FIG 3 has the following steps:

i) save the rest of the machine state to the state save area in the $CPU_{13}$ VARS structure.

The TOC register has been initialized. GPR2 has the Kernel TOC.

All the state has been saved into the PPC save state, structure pointed to by GPR3.

GPR4 contains the value of SRR1 (old msr)

GPR5 contains the value of DSISR

GPR6 contains the value of DAR

GPR7 $cpu_{13}$ vars pointer

GPR10 contains the SLIH TOC entry point.

ii) examine MSR[PR] bit to determine if this exception caused a user-to-kernel or kernel to kernel transition to know whether the kernel stack to be restored in r1 and choose the appropriate exit routine to return. If the PR bit was set to 1, the address of $load\_and_{13}$ $go_{13}$ user is loaded into the GPR14. Otherwise load r1 to point to the kernel stack from $CPU_{13}$ VARS structure pointed to by GPR7.

iii) allocate new $ppc_{13}$ $saved_{13}$ state area on the kernel stack and back chain it to the previous $ppc_{13}$ $saved_{13}$ state on the list.

iv) update the next pointer $cv_{13}$ $next_{13}$ rss in the rss chain to point to the new $ppc_{13}$ $saved_{13}$ state in the $CPU_{13}$ VARS structure.

v) allocate a c frame on the stack and null back chain it.

vi) Load GPR13 with the $PPC_{13}$ $SAVED_{13}$ STATE currently in GPR3. (GPR13 being non volatile and GPR3 is not non-volatile according to linkage conventions)

vii) Move GPR10 to Counter Register. Now the Counter Register should have address to SLIH.

viii) branch through the count register to the SLIH.

FIG 4 shows the Second Level Interrupt Handler (SLIH), which is part of the PowerPC exception handler 190.

The SLIH is generally a 'C' routine that actually handles the exception and returns. It is entirely left to the discretion of the SLIH to have the external interrupts re-enabled while they are executing. The SLIH will not return to the $call_{13}$ slih( ) routine because $call_{13}$ slih( ) loaded the correct exit routine in the link register prior to calling the SLIH.

FIG 5 shows the Exit Handler, which is part of the PowerPC exception handler 190.

This is the final phase of exception processing. The exit handler could be either $load_{13}$ $go_{13}$ sys(it was a kernel to kernel transition) or $load_{13}$ $go_{13}$ user (user to kernel transition). The only difference between these two routines is that in $load_{13}$ $go_{13}$ user rou-tine, the asynchronous system traps are processed.

FIG 5 has the following steps:

i) disable external interrupts.

ii) if returning to user mode, check the global variable $need_{13}$ ast. If set, re-enable external interrupts and call the AST handler, ast. When done, return to the top of exit handler $load_{13}$ $and_{13}$ $go_{13}$ user( ).

iii) BAT3 is enabled, establishing a virtual equals real mapping for low memory. To turn off translations, the kernel must be executing in low memory. A mapping of low memory must be present to do the jump.

iv) store current $ppc_{13}$ $saved_{13}$ state to the per CPU variable $cv_{13}$ $next_{13}$ rss. This causes the current $ppc_{13}$ $saved_{13}$ state area to be re-used on the next exception.

v) restore two registers temporarily in two SPRs so that there is room to store SRR0 and SRR1.

vi) Put the physical address of scratch save area/CPU$_{13}$ VARS into r1 vii) restore the remaining machine state.

viii) jump down to low memory. Here it jumps to physical address 0×3000 where the LOW$_{13}$ ADDRESS$_{13}$ RFI( )is. This routine does the following disable translations. restore SRR0 and SRR1 from the scratch registers. restore the two scratch registers from the special purpose registers.

rfi—Return from interrupt

State transitions

The PowerPC can be executing in one of two states.

kernel user

The exceptions always force a transition to the kernel mode no matter what mode the processor was in at the time the exception occurred. When an exception is accepted, execution resumes in kernel mode and in order for the kernel to execute properly, it should be executing on its own stack If the processor was executing in user mode at the time the exception happened, then the stack pointer points to the stack of the user thread and hence the stack needs to be switched. A kernel to kernel transition does not require the stack switch.

The exception processing is dependent on this state transition. If user to kernel transition has occurred, then the errors are reported through the thread's exception port. But any fatal errors such as an illegal or alignment exceptions occurring in the context of a kernel to kernel transitions are reported through a panic mechanism which halts the system.

The exit path out of exception is dependent on the transition. In the case of kernel to kernel transition, it exits out of the exception via the common exception path. But user to kernel mode transition may have to take care of some of the work that has been accumulated in the course of exiting from the exception to the user mode. For example a decrementer exception can occur if a second level interrupt handler had the external interrupts enabled. This means a context switch is necessary in the middle of a deeply nested exception. Instead of doing the context switch, a global kernel variable can be set to indicate that some external interrupts (Asynchronous System Traps) are pending to be processed. So on the way out of user to kernel exceptions, the occurrence of ASTs must be checked.

Data structures

PowerPC machine state

Exceptions are inherently asynchronous. When they occur, control is transferred to the FLIH. To transparently process the exception, there is a set of processor registers that must be preserved. This set of registers is referred to as machine state and it contains the following elements.

i) GPRS 0–31 ii) SRR0 (address of where execution is to resume. It is called iar in the ppc$_{13}$ saved$_{13}$ state structure)

iii) SRR1 (low 16 bits hold the value of MSR at the time of exception. The high 16 bits may contain information indicating the exact nature of exception It is called msr in ppc$_{13}$ saved$_{13}$ state)

iv) Link Register v) Condition Register vi) Counter register vii) XER register viii) MQ register (This is available only on the PowerPC601 implementation of the PowerPC architecture. This is to ensure that the machine state set is a superset of all the Power Architectures)

ppc$_{13}$ kerneL$_{13}$ state

This corresponds to the state of kernel registers as saved in a context-switch. It lives at the base of the kernel stack.

```
typedef struct pp_kernel_state {
    int ks_ss; /* preallocated ppc_saved_state */
    int ks_sp; /* kernel stack pointer */
    int ks_lr; /* Link register */
    int ks_cr; /* condition code register */
    int ks_reg13[19]; /* non volatile registers r13–r31 */
    int ks_pad; /* double word boundary */
};
cpu_vars
```

This structure holds all of the per CPU global variables.

```
typedef struct cpu_vars {
    /* these fields are read/write */
    struct fh_save_area cv_fast_save; /* fast save area */
    pp_state_t cv_next_ss; /*next exception save area */
    pp_state_t cv_user_ss; /* user mode exception save area */
    vm_offset_t cv_kernel_stack; /* per cpu stack */
    /* these fields are read_only after initialization */
    unit cv_toc; /* TOC value */
    vm_offset_t cv_call_slih; /* address of common call_slih( ) routine */
    vm_offset_t cv_dsisr_jt; /*physical address of DSISR jump table for
alignment exc. handler */
    int cv_cache_bs; /*cache block size in bytes */
    int cv_cpu_number_ix; /* cpu number index */
    int cv_cpu_number; /*cpu number */
    struct cpu_vars *cv_panic_slih; /*cpu_vars on which to run
panic_slih( ) */
    int cv_pad[6]; /* cache line alignment */
} cpu_vars_t;
```

This structure is initialized in ppc$_{13}$ init$_{13}$ stacks( ) routine. The fields cv$_{13}$ cpu$_{13}$ number,cv$_{13}$ cpu$_{13}$ number$_{13}$ ix,cv$_{13}$ toc,cv$_{13}$ call$_{13}$ slih and cv$_{13}$ panic$_{13}$ slihall hold constant values and can be thought of as read$_{13}$ only after ppc$_{13}$ init$_{13}$ stacks( ) is complete. The other fields are dynamic. At the time of ppc$_{13}$ init$_{13}$ stacks( ), there is no notion of user or kernel stacks. To handle exceptions that may come in during this time, kernel makes use of the panic stack as its run-time and exception stack.

This data structure is accessible to each cpu, with each looking at their personal copies. The SPRG3 register at the time of initialization, is made to point to $cpu_{13}$ vars in $ppc_{13}$ $init_{13}$ stack( ) routine. The $ppc_{13}$ $saved_{13}$ state is pre-allocated and $cv_{13}$ $next_{13}$ ss always points to this area. In user mode, it always points to the current thread's process control block (pcb). The $cv_{13}$ $user_{13}$ ss always points to the $current_{13}$ thread's pcb. A pointer to the bottom of the kernel stack of the thread is maintained in $cv_{13}$ $kernel_{13}$ stack.

$ppc_{13}$ $saved_{13}$ state

This structure describes the machine state as saved upon kernel entry. One structure lives in the pcb of the thread and holds the user state saved at the initial transition from user to kernel mode. Additional structures representing nested exceptions or interrupts and live on the kernel stack. The first structure of which lives just above the $ppc_{13}$ $kernel_{13}$ state.

The state save structures are pre-allocated The variable $cv_{13}$ $next_{13}$ rss in the per CPU structure always points to the save area that will be used at the next fault or interrupt. While running in user mode, it points to the pcb. The state save structures are linked in a chain to enable stack tracking.

```
typedef struct pp_saved_state {
    int regs[32]; /* users GPRS */
    int iar; /* user's instruction address register */
    int msr; /*user's machine state register */
    int cr; /* user's condition register */
    int lr; /*users link register */
    int ctr; /* user's count register */
    int xer; /*user's storage exception register */
    int mq; /* user's mq register */
    int ss_chain; /* pointer to previous exception in chain */
    int ss_reason; /* argument to pc_slih( ) */
    int ss_vaddr;
    int ss_extra; /* padding bytes to double word boundary */
} *pp_state_t;
    floatsave - floating point state structure
typedef floatsave {
    double fp_regs[32]; /* 32 64-bit floating point user registers */
    long fp_dummy; /*32 bits of padding so fp_scr can be stfd/lfd */
    long fp_jcr; /* floating point status and control register */
};
    pcb_t
```

This structure holds the user-mode machine state associated with a particular thread. The $ppc_{13}$ $saved_{13}$ state structure is filled in on transition from user to kernel mode. The floatsave structure is filled in lazily when some other thread needs floating point unit.

```
typedef struct pcb {
    struct ppc_saved_state pcb_ss;
    struct floatsave pcb_fp;
    struct ppc_machine_state ims;
} *pcb_t;
    fh_save_area
```

This structure provides the scratch area for storing registers GPR25-31, state save and restore regisers SRR0 and SRR1 and other registers LR, CR and XER. This is allocated in the $CPU_{13}$ VARS structure to be used by all the fast handlers that do not use the four-step exception processing scheme. Alignment exception handler is the only fast handler that uses this area in its own FLIH.

```
struct fh_save_area {
    long fh_scratch0;
    long fh_scratch1;
    long fh_scratch2;
    long fh_scratch3;
    long fh_gpr25;
    long fh_gpr26;
    long fh_gpr27;
    long fh_gpr28;
    long fh_gpr29;
    long fh_gpr30;
    long fh_gpr31;
    long fh_srr0;
    long fh_srr1;
    long fh_lr;
    long fh_cr;
    long fh_xer;
};
```

Global variables

The following are system global variables that are used primarily in exception processing.

1 $active_{13}$ threads[ ]

2 $active_{13}$ stacks[ ]

They have elements for each CPU on the system. Each element points to the current thread and stack on that CPU.

e.g. $active_{13}$ threads[O]—current thread on cpu 0/* refer to $current_{13}$ thread( ) macro definition */

[Note: Floating point exception handlers make use of another kernel variable called "$float_{13}$ thread" which points to the thread that has access to the floating point hardware]

Floating Point Exceptions

Float Unavailable

Introduction

This section briefly explains all the Floating Point related exception scenarios in the PowerPC architecture It also provides information as to how the microkernel perceives such exceptions in the context of an executing thread. It also furnishes PowerPC architecture specific such as the bit settings etc for each of the exception types.

PowerPC Information

A floating point unavailable exception occurs when no higher priority exceptions exist, an attempt is made to execute a floating-point instruction (including floating-point load, store and move instructions) and the floating point available bit in the MSR is disabled. (MSR[FP]=0)

The register settings for floating point unavailable exceptions are given below.

---

SRR0 - Set to the effective address of the instruction that caused the exception
SRR1 - 0 – 15 cleared
    16 – 31 Loaded from bits 16–31 of the MSR
MSR EE 0
0
  PR 0           FE 0
  FP 0           EP not altered
  ME not altered  IT 0
  FE0 0         DT 0

---

This exception type is vectored at 0x0800 in the exception vector table. When a floating point unavailable exception is taken, instruction execution resumes at offset 0x00800 from the physical base address indicated by MSR[EP].

Microkernel Information lazy context restore policy

Floating point hardware register set is not given to any user level thread unless it is required to perform floating point operations. Thus, for any non-floating thread, the context does not include the floating point hardware state. This effectively reduces the amount of information to be handled during each context switch time.

There are 32 64-bit floating point registers and a 32-bit Floating point status and control register in 32-bit PowerPC processor implementations. These add upto 260 bytes of information that would be saved and restored during a context switch even if the threads do not use them.

A thread, when it is created is given a context save area addressed as its PCB. The PCB consists of integer context and float-context save areas. Any thread created and scheduled for execution does not have a float save area addressed by its pcb. The thread's MSR (machine state register) has a bit to indicate the availability of floating point hardware to the thread. It is initially set to zero.

During the course of a thread execution, at the first instance of an attempt by the thread to execute a floating point instruction, the float unavailable exception to occurs. This in turn causes the microkernel's floating point exception handler to be invoked. The function of this exception handler is to make floating point available to the thread that required it. The exception handler dynamically allocates space for saving the thread's floating point registers, initializes the registers and turns on the float-available bit to 1 in its machine state register (MSR).

Figure 6:
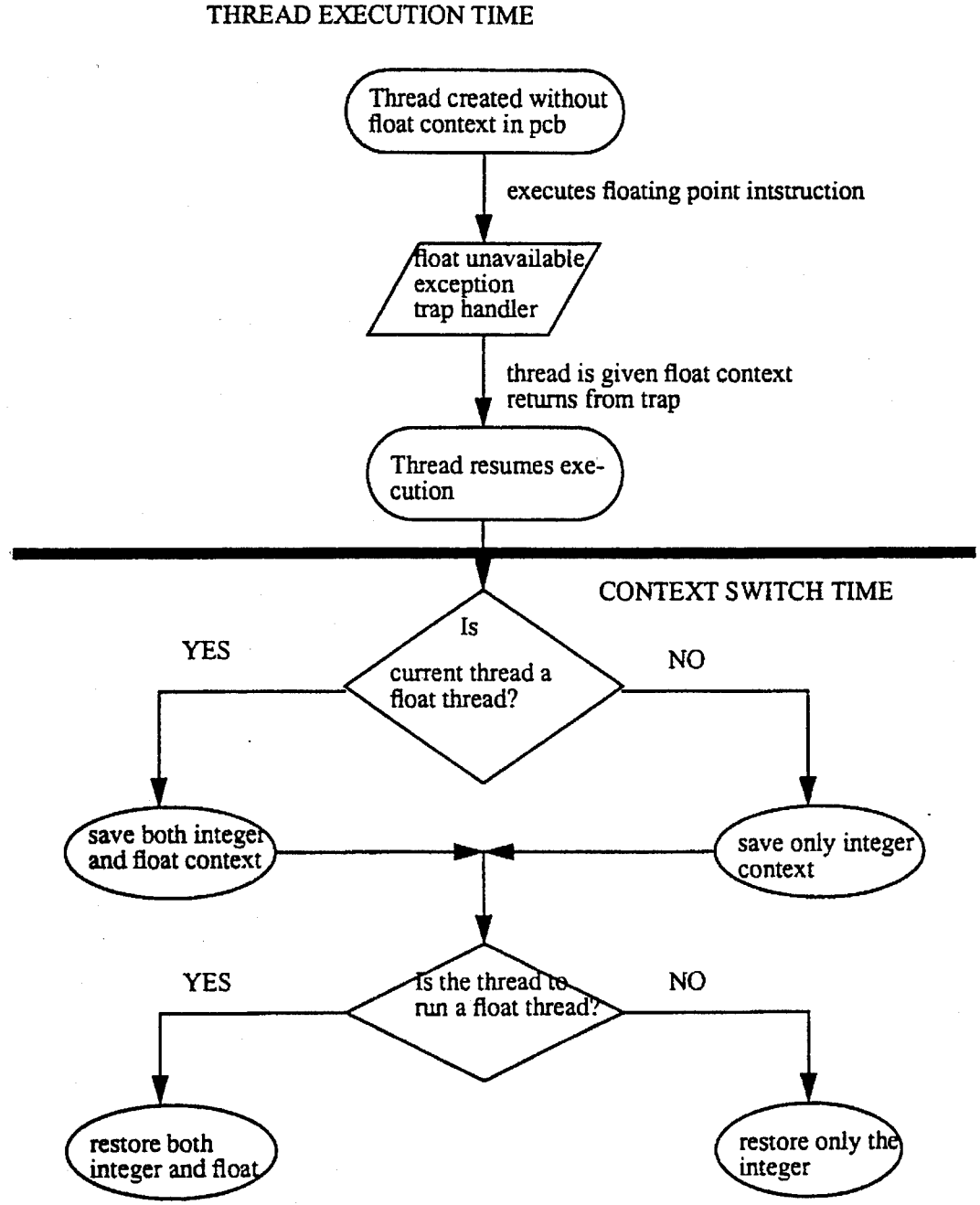
FIG. 6 shows a flow diagram of the lazy floating point exception handler 192, which is part of the PowerPC exception handler 190.

Once a thread obtains floating point context, it continues to have it during the remainder of its life The flow chart of FIG. 6 illustrates the floating point exception handler 192, which is part of the PowerPC exception handler 190.

The flow diagram of FIG 6 starts by creating a thread in the memory 102 without the floating point context indication in the thread's process control block (pcb). In accordance with the invention, this will prevent the copying of the floating point registers of the processor 110 on which the thread has been running, when its execution is terminated after a fault or interrupt.

While executing during a first occurring session, only fixed point (integer) operations will be carried out by the thread in the processor using the plurality of fixed point registers of the processor 110.

When a fault or an interrupt occurs terminating the first session (context switch time), the thread is removed from execution in the processor 110 and the contents of the fixed point registers are stored in the thread's process control block. The contents of the processor's machine state register (MSR), including the state of the current floating point context in the processor, is stored in the thread's process control block. In response to the stored indication of no floating point context, the contents of the plurality of floating point registers in the processor are not stored in the thread's process control block This significantly improves the overall performance of the system.

Later, when the thread's execution is restored in during a second occurring session, either in the same processor 110, or in an alternate processor 112, the contents of the process control block are examined to determine the state of the floating point context indication. Since the indication is that the thread does not have the floating point context, only fixed point operations are to be carried out with the thread in the processor using the plurality of fixed point registers. Thus, there is no attempt to copy back from the thread's process control block, values to load into the processor's floating point registers. This provides is a significant improvement in the overall performance of the system.

The indication that the thread does not have the floating point context is copied back from the thread's process control block, to the processor's machine state register. If the sequence of program instructions being run by the thread attempts to execute a floating point instruction during the second session, the floating point exception handler 192 is called by the processor (the instruction is trapped by the microkernel 120).

The exception handler 192 stores an alternate indication in the processor's machine state register that the floating point context is available for the thread. This enables the thread to perform floating point operations The thread then resumes execution of the floating point instruction.

If another fault or interrupt occurs, forcing a termination of the execution of the thread in the processor (context switch time), the thread is removed from the processor, terminating the second session. This time, the contents of both the plurality of fixed point registers and the plurality of floating point registers in the processor are stored in the thread's process control block in response to the alternate indication that it is enabled for floating point operations. Thus, only those threads that are performing floating point operations have the floating point registers copied at the termination of the thread's execution session in the processor. The machine state register is copied to the thread's process control block, including the floating point context status.

Later, when the thread's execution is restored in during a third occurring session, either in the same processor 110, or in an alternate processor 112, the contents of the process control block are examined to determine the state of the floating point context indication. Since the indication is that the thread does have the floating point context, both floating point and fixed point operations are to be carried out with the thread in the processor using the plurality of floating point and fixed point registers. Thus, the microkernel 120 copies back from the thread's process control block, values to load into the processor's floating point registers, in addition to the values to load into the processor's fixed point registers. The indication that the thread does have the floating point context is copied back from the thread's process control block, to the processor's machine state register. Thus, only those threads that are performing floating point operations have values copied out of their process control blocks to load into the processor's floating point registers at the restoration of execution of the thread's in the processor.

In an alternate embodiment of the invention, if a processor A 110 in FIG. 1 has only one thread executing within it that has the floating point context, then the contents of that processor's floating point registers do not need to be saved when that thread is removed from the processor. If all other threads executing within that processor 110 are not using the floating point registers, the values loaded into those registers by the sole floating point thread remain untouched. In accordance with the invention, each processor maintains a data structure 196A for processor A 110 and data structure 196B for processor A 112 in the memory 102 of FIG. 1. The data structure 196A stores the name of the sole floating point thread that is executing in the respective processor A 110. Similarly, the data structure 196B stores the name of the sole floating point thread that is executing in the respective processor B 112. Then, when a second thread having a floating point context is to begin execution in the processor A 110, the processor A 110 calls the floating point exception handler 192. The floating point exception handler 192 then copies the contents of the processor's 110 A floating point registers, gets the name of first thread from the data structure 196A, and saves the copied values in the process control block for the named first thread. Then the second thread can begin execution in the processor A 110, and can load its own values into the processor's A 110 floating point registers. In this manner, the contents of the floating point registers of the processor A 110 need not be saved at all, if there is only one floating point thread executing in that processor A 110.

For multiprocessor configurations, when the first thread is to resume execution in a different processor B 112, the floating point exception handler 192 is called to copy the contents of the floating point registers of the first processor A 110, to those of the second processor B 112, if the first thread was the sole floating point thread that was executing in the first processor A 110.

Multiprocessing and performance

The lazy context restore policy is multiprocessor enabled. In the sense, the floating context is associated with the thread executing as opposed to being to tied to a processor. In other words, earlier systems solved this problem by adopting a lazy float context switch policy whereby only a thread owns the floating point hardware at any time.

In such a scheme, when a thread traps into the kernel for getting the float context, the trap handler allocates and provides the thread floating point save area. It also designates the thread as being the float thread of this processor. In the event, another thread requires to use floating point hardware, it traps into the kernel. This time the trap handler designates the new thread as the float thread for this processor after saving the old float thread's floating point registers and restoring the new thread's floating point registers.

In a uniprocessor systems also, lazy context switch can be expensive, particularly in float intensive applications since the overall context switch time is increased by the exception handling path also. But with lazy context restore policy, because threads have the float context since obtaining it, all subsequent context switches would include both integer and floating point state.

For a multi-processor system, the concept of tying a float thread to processor makes it difficult to obtain and move the state information across processors. With the lazy float restore policy, it is guaranteed that if a thread is a float thread, it has its latest floating point state information when it is ready to run on any processor.

External Interface Details

This section explains the interface details of the SLIH for the float$_{13}$ unavailable exception The name of the SLIH is float$_{13}$ unavailable( ).

It is invoked as follows. void float$_{13}$ unavailable(struct ppc$_{13}$ saved$_{13}$ state *state)

It expects the ppc$_{13}$ saved$_{13}$ state to be passed to it by the pre-second level interrupt handler call$_{13}$ slih( ) routine.

Data structures

The following global data structures are affected by this routine.

The thread data structure of the current thread in which this fault has occurred. This routine essentially changes the thread's machine state by changing the MSR bit settings in the thread's pcb. It also restores the thread's floating point context by loading the floating point registers from the thread's float save area in the pcb.

Functional Description

Float Unavailable

Function name: float$_{13}$ unavailable( )

Purpose: To handle float$_{13}$ unavailable exception that occurred in a thread. Prototype: void float$_{13}$ unavailable-(struct ppc$_{13}$ saved$_{13}$ state *state);

Input: The machine state as saved upon kernel entry output: none return values: none error codes:

routines invoked: panic( ),float$_{13}$ load( ),float$_{13}$ store( )

Logic:

If it has happened in the previleged/Supervisor mode then panic and quit Fetch the current thread Allocate float save area (260 bytes) and make thread's float save area pointer point to it Initialize all the registers. turn on its MSR[FP] in its pcb; load the floating point registers with the current thread's float save area;

Errors and Messages

1) Floating point unavailable in kernel mode

Since kernel does not make use of floating point, this fault is not expected to occur in kernel mode.

Floating Point Program Exceptions

Introduction

This section describes all the floating point program exceptions that can occur in the PowerPC architecture and how those exceptions are processed in the microkernel. It provides functional descriptions of all the routines that are related to the floating point enabled program exception handling.

PowerPC information

The control with regard to enabling and disabling the floating point program exceptions is provided in the PowerPC hardware both in the machine state register as well as in the Floating Point Status and Control register. Both the registers have floating point exception enable bits that need to be set to recognize and process these exceptions. FIG. 7 illustrates the bit significance of FPSCR register.

A floating point program exception occurs when no higher priority exception exists and the following condition which correspond to bit settings in SRR1, occur during execution of an instruction System floating point enabled exception is generated when the following condition is met:

(MSR[FE0]|MSR[FE1]) & FPSCR[FEX] is 1

FPSCR[FEX] is set by the execution of a floating point instruction that causes an enabled exception or by the execution of a "move to FPSCR" type instruction that sets an exception bit when its corresponding enable bit is set. In the MPC-601 ,all floating point enabled exceptions taken clear SRR1[15] to indicate that the address in SRR0 points to the instruction that caused the exception because all floating point enabled exceptions are handled in a precise manner on the MPC601.

Floating point exceptions are signalled by condition bits set in the floating point status and control register They can cause the system floating point enabled exception error handler to be invoked.

The following conditions that can cause program exceptions are detected by the processor. These conditions may occur during execution of floating point arithmetic instructions. The corresponding bits set are indicated in parentheses.

I) Invalid floating point operation exception (VX)
   i) sNaN (VXSNAN)
   ii) Inf-Inf (VXISI)
   iii) Inf/Inf (VXIDI)
   iv) zero/zero (VXZDZ)
   v) Inf*zero (VXIMZ)
   vi) Illegal compare (VXVC)
II) Software request condition (VXSOFT)
III) Illegal integer convert
IV) zero divide
V) Overflow
VI) Underflow
VII) inexact The exception bit indicates occurrence of the corresponding condition. If a floating point exception occurs, the corresponding enable bit governs the results produced by the instruction and, in conjunction with bits FE0 and FE1, whether and how the system floating point enabled exception handler is invoked.

When an exception occurs, the instruction execution may be suppressed or a result may be delivered, depending on the exception type as well as if the exception is enabled or not.

Instruction execution is suppressed for
   i) enabled illegal floating point operation
   ii) enabled zero divide Default result is generated and written to the destination specified by the instruction causing the exception
   i) disabled and enabled overflow
   ii) disabled and enabled underflow
   iii) disabled and enabled inexact
   iv) disabled zero divide
   v) disabled illegal floating point instruction In the PowerPC architecture, setting enable bits causes the generation of the result value specified in the IEEE default behavior standard for the "trap enabled" case and if the enable bit is 0, it causes the generation of the default value specified for the "trap disabled" case. The "trap disabled" case is when both FE0 and FE1 are cleared in the MSR and all the enable bits are cleared in the FPSCR. If the program exception handler should notify the software that a given exception condition has occurred, the corresponding FPSCR enable bit must be set and a mode other than Ignore exception mode should be selected. In the MPC601, both FE0 and FE1 are 'OR'ed. Unless both are cleared, MPC601 operates in precise mode.

The MSR register bits FE0 and FE1 (bit positions 20 and 23. Both of them) need to be on to enable the processor to execute in "Synchronous precise mode". This ensures that all the Floating Point Program exceptions are recognized and the Floating Point Exception handler is invoked if they are individually enabled through the control bits of the FPSCR.

The standard default results may be satisfactory under most circumstances. This coupled with the performance optimization objectives, renders the Synchronous precise mode optional and to be used only for debugging and specialized applications.

The program exceptions are vectored at 'x0700' in the vector table.

The SRR0 has the Effective Address of the instruction that caused the exception

SRR1 0–10 cleared

11—set to indicate a floating point enabled program exception

12–15 cleared

16–31 loaded from bits 16–31 of the MSR at the time the exception has occurred

Microkernel information

Once a thread attains the Floating Point capability, while executing floating point instruction, can potentially cause synchronous floating point program exceptions if enabled for such faults.

The system $pr_{13}$ slih handler is invoked by the FLIH for many exception conditions including Program Exceptions. The Floating point Enabled exceptions are such exceptions and are handled by the $pr_{13}$ slih routine.

Since these are program instruction caused exceptions, it is adequate at the kernel level, the system $pr_{13}$ slih handler obtain the current floating point status of the faulting thread, format a floating point enabled program exception message and report it to the exception server.

Additionally a kernel interface is provided to the applications in order to set and get the hardware state for a specific thread within a task. These calls are provided to facilitate individual threads to have control and be able to manipulate the register settings and fetch the status information. These calls are machine specific since they directly read and write into the thread's machine state save area. Actual details of the interface are explained in the following sections.

External Interface $pr_{13}$ slih function interface

The system $pr_{13}$ slih handler is invoked in case of a floating point program exception as follows

```
pr_slih (struct ppc_saved_state *state,
    long srr1,
    long dsisr,
    long dar)
``` where state is machine state as saved upon kernel entry srr1 is the segment register SRR1 dsisr is the DSISR register settings when the exception occurred.

dar is the data address register

The $pr_{13}$ slih routine formats an exception message and raises an exception to the exception server by calling the exception routine exception(exc,codes, $code_{13}$ size)

where exc is the generic exception type
   codes is an array of values including register settings and so on
   $code_{13}$ size is the no. of elements in the code array
   kernel-thread interface The kernel interface comprises of two state related routines namely thread₁₃ set₁₃ state (thread₁₃ t thread,int flavor,thread₁₃ state₁₃ t new_state, uint new₁₃ state₁₃ count)

where
thread—thread for which the state is to be altered
flavor—machine specific flavor
  PPC₁₃ THREAD₁₃ STATE—refers to the thread's machine context except FP
  PPC₁₃ FLOAT₁₃ STATE—refers to the thread's FP context
new_state—new state
count—no of natural storage units for the state set thread₁₃ get₁₃ state(thread₁₃ t thread, int flavor, thread₁₃ state₁₃ t new₁₃ state,int *new₁₃ state₁₃ count)

where
thread—thread the state of which is to be obtained
flavor—machine specific flavor
  PPC₁₃ STATE₁₃ FLAVOR₁₃ LIST—list of flavors supported by the ppc implementation
  PPC₁₃ THREAD₁₃ STATE—refers to the thread's machine context except FP
  PPC₁₃ FLOAT₁₃ STATE—refers to the thread's FP context
new₁₃ state—new state
count—no. of natural storage units for the state set
Data structures
floating point program exception handler—pr₁₃ slih routine
Floating point program exception handling portion of the pr₁₃ slih handler deals with the following data structures
codes—the code array passed to the exception call
code₁₃ size—no. of elements that are present in the code array
The code array is filled as follows
codes[0]=EXC₁₃ FLOAT₁₃ ARITHMETIC; /*defined in machine specific exception. h include file */
codes[1]=EA;/* effective address of the instruction that caused the exception */
code₁₃ size=2;
  floating point kernel interface [thread₁₃ set₁₃ state( ) & thread₁₃ get₁₃ state( )]

1. thread₁₃ set₁₃ state with ppc₁₃ thread₁₃ state flavor thread's machine state in the thread's PCB. (thread→pcb→pcb₁₃ rss)

This is the ppc₁₃ saved₁₃ state structure of the thread's pcb and it is modified with the state information that the user has provided. The ppc₁₃ thread₁₃ state structure that is used as a handle to pass the state information is defined in machine specific include files.

2. thread_set₁₃ state with ppc₁₃ float₁₃ state flavor
thread's machine float state in the thread's PCB.

(thread→pcb→pcb₁₃ fp)

This is the floatsave area of the thread's pcb that is set to the user provided state information. The ppc₁₃ float₁₃ state structure that is used as a handle to pass the state information is defined in machine specific include files.

3. thread₁₃ get₁₃ state with ppo₁₃ thread₁₃ state flavor
This does not alter the thread's data structure. It simply copies the thread's machine state information from its pcb to the structure passed by the user.

4. thread₁₃ get₁₃ state with ppc₁₃ float₁₃ state flavor
This routine in turn calls the float₁₃ get₁₃ state( ) routine which does the synchronization of floating point state information if the requesting thread is the floating thread meaning it stores the floating point hardware registers into the thread's pcb floatsave area before it passes that information to the user consistent with lazy floatsave policy It turns the "FP available" bit in the MSR to off.

[Note: All the above routines call thread₁₃ hold( ) to suspend thread temporarily while modifying the thread's data structures and call thread₁₃ release( ) after they are finished with modifying the state information]

Functional Description
pr₁₃ slih handler
Function name: pr₁₃ slih( )
purpose:
The pr₁₃ slih handler is invoked for multiple exception conditions. So based on the reason passed to it by the FLIH, its control flow is altered. This section describes floating point program exception specific logic of the pr₁₃ slih handler.

```
Prototype: void pr_slih(struct ppc_saved_state *state,
    long srr1,
    long dsisr,
    long dar)
Input:
    state: The machine state as saved upon kernel entry
    srr1: is the segment register SRR1
    dsisr: dsisr register settings for the exception
    dar: is the data address register
output: none
return values: none
error codes:
routines invoked: panic( ), float_read_fpscr( ) ,exception( )
Logic
            begin
if (problem state is supervisor mode)
then
    panic( );
end
else
begin
    switch (reason)
```

-continued

```
begin
    case:
        ...
    case:
        ...
    case FP_PROGRAM_EXCEPTION:
    begin
            set exception to EXC_ARITHMETIC;
        set codes[0] to EX_PPC_FLOAT_ARITHMETIC;
        set codes[1] = state -> iar;
        code_size = 2;
        break;
    end
    default:
    end
end
call exception(exception,codes,code_size);
    /* to raise an exception to the exception server in the exception port
*/
end
```

Kernel Interface

The kernel interface essentially comprises of the following major routines in the thread library. They are namely 1. $thread\_get\_state$: to get the current state information for the thread for a machine specific flavor 2. $thread\_set\_state$: to set the current state information for the thread for a machine specific flavor These two calls provide generic interface to the outer world by taking specific machine flavors and the corresponding state information as parameters. They in turn call machine specific routines that alter the pcb structure for the thread. They are 1. $thread\_setstatus()$ 2. $thread\_setstatus()$. They are explained in the following sections.

$thread\_set\_state$ purpose

To provide generic thread interface to deal with machine dependent hardware specific flavors and set the required state of the thread according to the flavor

```
prototype
kern_return_t thread_set_state(thread_t thread, int flavor,thread_state_t
new_state,uint new_state_count)
Input
    thread: current thread's data structure
    flavor: machine flavor
            PPC_FLOAT_STATE
            PPC_THREAD_STATE(These are the only two flavors
that are currently supported)
    State:  The machine state corresponding to the machine flavor
    count: byte count of state information (fixed for each flavor)
output: none
return values: KERN_SUCCESS if successful
        KERN_INVALID_VALUE if the flavor passed is not legal flavor
value
error codes: none
routines invoked:thread_setstatus
Logic
Begin
    if (thread eq NULL OR thread is the current thread executing)
        return (KERN_INVALID_ARGUMENT);
    call thread_hold;/ *the thread is suspended */
    call thread_do_wait; /* wait until thread enters 'STOPPED' state */
    call thread_setstatus;/* call machine specific setstatus routing */
    call release_thread;
end
    thread_get_state
``` purpose:

To provide generic thread interface to deal with machine dependent hardware specific flavors and get the required state of the thread according to the flavor prototype:

$kern\_return\_t\ thread\_get\_state(thread\_t\ thread, int\ flavor, thread\_state\_t\ new\_state, uint\ *old\_state\_count)$

```
Input:
    thread: current thread's data structure
    flavor: machine flavor
           PPC_FLOAT_STATE
           PPC_THREAD_STATE(These are the only two flavors
that are currently supported)
    State:  The machine state corresponding to the machine flavor
    count: byte count of state information (fixed for each flavor)
output: none
return values: KERN_SUCCESS if successful
        KERN_INVALID_VALUE if the flavor passed is to legal flavor
value
error codes: none
routines invoked:thread_getstatus
Logic
begin
    if (thread eq NULL OR thread is the current thread executing)
        return (KERN_INVALID_ARGUMENT);
    call thread_hold;/ *the thread is suspended */
    call thread_do_wait; /* wait until thread enters 'STOPPED' state */
    call thread_getstatus;/* call machine specific setstatus routing */
    call release_thread;
end
    thread_setstatus
``` purpose:

The thread$_{13}$ setstatus routine based on the flavor requested, would appropriately set the registers in the machine state associated with the thread. Since this section particularly dwells on the floating point state,it provides only the floating point pertinent information

```
Prototype:
kern_return_t thread_setstatus(thread_t thread, int flavor, thread_state_t
tstate,uint count)
Input:
    thread: current thread's data structure
    flavor: machine flavor
            PPC_FLOAT_STATE
            PPC_THREAD_STATE(These are the only two flavors
that are currently supported)
    State:   The machine state corresponding to the machine flavor
    count: byte count of state information (fixed for each flavor)
output: none
return values: KERN_SUCCESS if successful
        KERN_INVALID_VALUE if the flavor passed is not legal flavor
value
error codes: none
routines invoked: float_set_state
Logic
    begin
            switch (flavor)
begin
    case PPC_THREAD_STATE:
        . . . . . . .
    case PPC_FLOAT_STATE:
    begin
        if (count is not equal to PPC_FLOAT_STATE_COUNT)
        return (KERN_INVALID_VALUE);
        return (float_set_state(thread,(struct PPC_float_state*)tstate);
    end
    default:
        . . . . .
end
end
    thread_getstatus
``` purpose:

The thread$_{13}$ getstatus routine based on the flavor requested, would appropriately get the registers in the machine state associated with the thread. Since this section particularly dwells on the floating point state,it provides only the floating point pertinent information

```
Prototype:
kern_return_t thread_getstatus(thread_t thread, int flavor,thread_state_t
tstate,uint* count)
Input:
    thread: current thread's data structure
    flavor: machine flavor
            PPC_STATE_FLAVOR_LIST
        PPC_FLOAT_STATE
PPC_THREAD_STATE (These are the only flavors that are currently
supported)
    State:   The machine state corresponding to the machine
flavor
    count: byte count of state information (fixed for each flavor)
output: The state information requested
    the byte count of the state information
return values: KERN_SUCCESS if successful
        KERN_INVALID_VALUE if the flavor passed is not legal flavor
value
error codes: none
routines invoked: float_get_state
Logic
begin
    switch (flavor)
    begin
        case THREAD_STATE_FLAVOR_LIST:
            if (count <1)
               return (KERN_INVALID_ARGUMENT);
            tstate[0] = PPC_THREAD_STATE;
            tstate[1] = PPC_FLOAT_STATE;
            *count = 2;
            break;
        case PPC_THREAD_STATE:
            . . . . . . .
        case PPC_FLOAT_STATE:
```

```
                                          -continued
                begin
                    if (count is < PPC_FLOAT_STATE_COUNT)
                        return (KERN_INVALID_VALUE);
                    *count = PPC_FLOAT_STATE_COUNT;
                    return (float_get_state(thread,(struct PPC_float_-
state *)tstate);
                        end
                        default:
                             . . . . .
                    end
                end
                            float_set_state
``` purpose:

The float_13 set_13 state routine would appropriately set the floating point registers in the machine state associated with the thread

Alignment Exceptions

Overview

```
Prototype:
kern_return_t float_set_state(thread, thread_state_t tstate)
Input:
    thread: current thread's data structure
    State:   The machine state corresponding to the machine flavor
Output: modified thread structure
Return values: KERN_SUCCESS if successful
               KERN_FAILURE otherwise
Error codes: none
Routines invoked: none
Logic
begin
    copy new floating point state information tstate to the floatsave area
           of the thread's pcb;
    return (SUCCESS);
end
    float_get_state
``` purpose:

The float_get_13 state routine would get the floating point machine state associated with the thread. This routine calls the float_13 sync_13 thread( ) routine to force a lazy save of the floating point state if the thread is the float thread.

This section illustrates various scenarios associated with an alignment exception in the PowerPC architecture. It deals with the alignment exception situations occurring in both little and big Endian modes. It also attempts to highlight the differences between MPC601 processor implementation and

```
Prototype:
kern_return_t float_set_state(thread_t thread, thread_state_t tstate)
Input:
    thread: current thread's data structure
    State:   The machine state corresponding to the machine flavor
output: requested tstate
return values: KERN_SUCCESS if successful
               KERN_FAILURE otherwise
error codes: none
routines invoked: float_sync_thread( )
logic
begin
if the thread is the floating thread
begin
    call float_sync_thread( )
    end
    copy new floating point state information from the floatsave area to tstate;
    return (SUCCESS);
    end
```

Errors and Messages

1) Program Floating point enabled fault in kernel mode

Since kernel does not make use of floating point, this fault is not expected to occur in kernel mode.

a PowerPC architecture and the instructions of PowerPC architecture that are not supported by 601 processor. It provides functional descriptions of the alignment exception handler.

MPC-601 Information

On the 601 processor, alignment exceptions occur under the following conditions:

i) Any floating-point transfer with a non-memory forced I/O segment ii) Any transfer that crosses a segment or BAT boundary iii) A dcbz to a write-through or cache-inhibited area iv) A lscbx transfer that crosses a page boundary v) Any misaligned transfer that crosses a page boundary A misaligned transfer is one in which the data is transferred to an address that is not an integer multiple of the size of the data. A string or multiple transfer is considered aligned if the transfer starts on a word boundary. When operating in big-endian mode, the 601 processor handles all misaligned transfers transparently, except as listed above, by internally breaking the transfer up into several smaller sized transfers. Note that single byte transfers never cause an alignment exception.

Additionally, when the 601 processor is operating in little-endian mode the following conditions will cause an alignment exception to occur:

i) Any misaligned transfer ii) Any load or store multiple or string operation PowerPC Information In addition to the conditions that may cause an alignment exception on the 601 processor, the PowerPC architecture specifies that the following conditions may cause an alignment exception to occur:

i) Any floating-point transfer that's not word-aligned ii) Any fixed-point doubleword transfer that's not word-aligned iii) Any lmw, stmw, lwarx, or stwcx transfer that's not word-aligned iv) Any ldarx, or stdcx transfer that's not doubleword-aligned v) Any string transfer that crosses a page boundary Support for operations not supported by the 601 processor is provided by the exception handler to provide full PowerPC compatibility. This involves adding branch out routines into the dsisr jump table for the new instructions. See Appendix B for a list of PowerPC instructions that may cause alignment exceptions that are not supported by the 601 microprocessor. Code in support of quadword floating-point loads and stores exists but will be conditionally compiled out in the 601 processor implementation. In addition to inserting the appropriate branch out routines into the dsisr jump table, new modules will have to be written to deal with fixed-point doubleword operands and for handling the stfiwx, lwa, lwaux, and ldarx instructions.

Some instructions are also interpreted differently from the 601 implementation than when implemented by a strict PowerPC processor. These differences will have to be determined and analyzed in full detail when moving to a strict PowerPC architecture. As an example, load multiple and load string operations when the source register is within the range of the destination are permitted on the 601 processor but are considered invalid operations under a strict PowerPC implementation. Also, non-word-aligned load or store multiples are invalid under the PowerPC architecture but are permitted by the 601 processor.

Finally, the lscbx instructions implemented by the 601 processor are not part of the PowerPC architecture and future implementations will have to decide whether to treat these instructions as illegal instructions or to emulate them to remain backwards compatible. If it is decided that the lscbx instructions will be emulated then the alignment exception handler code may be used for this purpose.

Microkernel info

The goal of the alignment exception handler is to emulate the transfer for the user in a completely transparent and in as expedient a manner as possible The alignment exception handler will break up the transfer into smaller sized transfers that will not cause alignment exceptions.

In the process of emulation, memory protection mechanisms will be enforced as if the user-level program was performing the transfer rather than the supervisor-level exception handler To enforce this restriction, the exception handler will check for and prevent access to the kernel segments The exception handler will raise a data access exception for any such potential access.

Also, it will be assumed, and verified through a code review of the virtual memory support code, that the Kp and Ks bits for the user segments will always be set to the same value.

Note that any and all multiple and string operations will invoke an alignment exception when operating in little-endian mode. As such, these instructions should never be produced by any little-endian PowerPC compiler. These instructions will not be emulated in little-endian mode and will raise an illegal instruction exception instead.

Areas of code that are big-endian specific will be inclosed in the following conditional inclusion preprocessor statements:

```
#if (BYTE_ORDER == BIG_ENDIAN)
  ...
#endif /* (BYTE_ORDER == BIG_ENDIAN */
```

Areas of code that are little-endian specific will be enclosed in the following conditional inclusion preprocessor statements:

```
#if (BYTE_ORDER == LITTLE_ENDIAN)
  ...
#endif /* (BYTE_ORDER == LITTLE_ENDIAN */
```

The $BYTE_{13}$ ORDER token will be defined as a compiler/preprocessor command line argument. The value used for $BYTE_{13}$ ORDER will be determined through Makefile target selection The tokens $BIG_{13}$ ENDIAN and $LITTLE_{13}$ ENDIAN are defined in the header file mach/endian.h.

[As indicated in "PowerPC Operating Environment Architecture, Book III", software should not attempt to obtain a reservation for unaligned lwarx (or ldarx) operands, nor to simulate an unaligned stwcx. (or stdcx.). For this reason these events will not be emulated and will raise an alignment exception instead]

Alignment exception handling—user choice

Sometimes specific application and system scenarios require that the system not handle the alignment exceptions every time they occur but simply notify the application of the same. This is done primarily for performance reasons. The application this way has the ability to choose the best way to handle the alignment problems as opposed to trapping into the kernel. To facilitate this, functionality is provided such that a thread can register itself to be notified by the system in the event of an occurrence of a alignment exception. Since then, the application may choose to switch to byte memory access which will not cause alignment exceptions.

External interface

Since the goal of the alignment exception handler is to provide transparent resolution of the exception there is no external interface required. Putting this aside, it may be desirable to provide a mechanism for informing the developer of code that produces misaligned transfers. There are two mechanisms which would be useful for relaying this information to the developer. The first is to insert trace hooks into the exception handler when PowerPC assembly language trace hook macros become available. The second method is to implement a special flavor of thread$_{13}$ state that indicates that misaligned transfers are to raise an exception. Only misaligned transfers, not boundary crossings, would cause an exception to be raised. This mechanism will not be implemented as part of this design, and is only mention here as a possible future enhancement.

Functional Description specifications

The low memory vector address for the alignment handler is at offset 0×600 from the base address indicated by the setting of the MSR[IP] bit. Upon entry to the alignment handler, the machine is in the following state:

i) External Interrupts are disabled ii) Processor is privileged to execute any instruction.

iii) Processor can not execute any floating point instructions, including floating-point loads, stores, and moves.

iv) Floating point exceptions are disabled.

v) Instruction address translation is off.

vi) Data address translation is off.

vii) SRR0 contains the address of the instruction causing the exception.

viii) SRR1 contains bits 16–31 of the MSR.

ix) DAR contains the starting transfer address for the operation that caused the exception.

x) DSISR contains selected bits of the instruction for decoding the type of instruction that caused the exception.

Alignment exceptions will be treated as non-context switching events which are only invoked from user-level (problem mode) programs. To expedite processing and to prevent nesting the following policies will be implemented:

i) the alignment exception handler will avoid a full state save and will only save those registers used or affected by the exception handler code.

ii) external interrupts will remain disabled.

iii) instruction translations will remain disabled.

iv) data translations will remain disabled except as necessary to perform the unaligned load or store.

v) AST checks will not be performed on return from the exception handler.

vi) The only exception that should occur during alignment handler execution is a data access exception while performing the unaligned load or store.

vii) Handler code segment and private cpu save area must be accessed in real mode (translations off).

viii) An exception will be raised immediately for the following cases: Effective address within kernel segment (EXC$_{13}$ BAD$_{13}$ ACCESS/KERN$_{13}$ INVALID$_{13}$ ADDRESS), unaligned lwarx, ldarx, stwcx., stdcx. operands (EXC$_{13}$ HW$_{13}$ EMULATION/EXC$_{13}$ PPC$_{13}$ ALIGNMENT), attempted execution of lswi, lswx, stswi, stswx, lscbx, lscbx., lmw, or stmw while in little-endian mode (EXC$_{13}$ BAD$_{13}$ INSTRUCTION/EXC$_{13}$ PPC$_{13}$ BEOPONLY)

Handler Design

It is possible for the alignment handler to cause a data access exception due to a page fault or protection violation. This is handled with a special dependence on the data access exception handler. The data access exception handler must determine if the exception was caused by the alignment exception handler by checking the MSR[IT] bit in the SRR1 register If this bit is clear, then the data access exception handler resolves the fault condition, backtracks to the original machine state prior to the alignment exception by restoring state saved by the alignment exception handler, and restarts the original instruction. This will result in another alignment exception, but this time no data access should be generated since the page fault condition has been resolved.

FIG. 8 is a flow diagram of the alignment exception handler 194, which is part of the PowerPC exception handler 190 The steps are as follows:

1) Entry at physical address 0×600.

2) Temporarily save a work register into SPR$_{13}$ G0.

3) Get address of cpu$_{13}$ vars fh$_{13}$ save$_{13}$ area from the SPR$_{13}$ CPU register.

4) Convert virtual address of fh$_{13}$ save$_{13}$ area into a physical address.

5) Save registers used or affected by exception handler (GPR25 through GPR31, LR, CR, XER, SRR0, and SRR1).

6) Move copies of DSISR, DAR, and MSR into work registers.

7) Assert that processor was in problem mode at time of exception.

8) Check address bounds of operation against kernel virtual address space.

9) Move DSISR into CR for bit tests.

10) Branch into instruction decode (dsisr) table based on DSISR[15–21]

11) Execute appropriate submodule (submodule descriptions are given in the following submodules section)

12) Restore saved state and return to user mode.

Alignment Handler—Sub modules

Fixed Point Load Module:

This module handles all of the fixed point load instructions. The appropriate number of bytes (2 or 4) are loaded individually and reassembled into a scratch register, manipulated as necessary if a byte-reverse or algebraic operation. Then, the load table is used to move the data to the appropriate target register. Finally, a check for update form is performed and the address register updated with the effective address of the instruction as appropriate.

Fixed Point Store Module:

This module handles all of the fixed point store instructions. The store table is used to move the data from the source register to a scratch register. Then, the data (2 or 4 bytes) is stored to the target address one byte at a time, manipulating the data as necessary for byte$_{13}$ reversed operations. Finally, a check for update form is performed and the address register is updated with the effective address of the instruction as appropriate.

Floating Point Load Module:

This module handles all of the floating point load instructions. The appropriate number of bytes (4, 8, or 16) are loaded from the source address individually and reassembled into scratch register(s) and written to the local save area. The floating point table is then used to move the data from the save area to the appropriate target floating point register(s). Finally, a check for update form is performed and the address register updated with the effective address of the instruction as appropriate.

Floating Point Store Module:

This module handles all of the floating point store instructions. The floating point table is used to move the appropriate number of bytes (4,8, or 16) from the floating point source register to the local save area. Then, the data is written to the target address 1 byte at a time. Finally, a check for update form is performed and the address register updated with the effective address of the instruction as appropriate.

Load Multiple and Load String Module:

This module handles the move assist load string instructions as well as the load multiple instruction. The length of data to be transferred is acquired, and then the data is loaded a byte at a time and reassembled into a scratch register. When the scratch register is full, the load table is used to move the data to the appropriate target register. If the target register ever overlaps the address register, the 4 bytes targeted for that register are ignored.

NOTE: In the case of the load string immediate, the actual instruction will have to be fetched in order to determine the length of the operation.

Store Multiple and Store String Module:

This module handles the move assist store string instructions as well as the store multiple instruction. The length of data to be transferred is acquired, and then the data is moved 4-bytes at a time via the store table to a scratch register, which is then written 1 byte at a time to the target address.

NOTE: In the case of the store string immediate, the actual instruction will have to be fetched in order to determine the length of the operation.

Load String and Compare Module:

This module handles only the load string and compare byte instruction. Bytes are loaded 1 at a time and compared against the match byte of the XER. When a match is found, or the maximum length as specified in the XER is reached, the resulting length field of the XER is updated and if this instruction was a record form, the appropriate Condition Register field is updated.

NOTE: The actual instruction will have to be fetched in order to determine the setting of the record mode bit.

Data Cache Block Zero Module:

This module handles only the data cache block zero instruction. The cache block boundaries are determined from the target address, and the resulting block of memory is cleared.

Data Structures

Data structures required to support the alignment handler are all accessed though the system special purpose register cpu data pointer. The design requires modification of the $cpu_{13}$ vars structure to include the fast exception save area and the physical addresses of the various alignment handler jump tables (dsisr, update, load, store, floating-point ops).

Each CPU must have its own private fast handler save area. The size of the fast handler save area is 64 bytes and must be quadword aligned. The fast handler save area will be at the beginning of the private cpu data structure $cpu_{13}$ vars referenced as element $fh_{13}$ $save_{13}$ area. The layout of the fast handler save area is as follows:

```
struct fh_save_area {
    unsigned long fh_scratch1;
    unsigned long fh_scratch2;
    unsigned long fh_scratch3;
    unsigned long fh_scratch4;
unsigned long fh_gpr25;
    unsigned long fh_gpr26;
    unsigned long fh_gpr27;
    unsigned long fh_gpr28;
    unsigned long fh_gpr29;
    unsigned long fh_gpr30;
    unsigned long fh_gpr31;
    unsigned long fh_srr0;
    unsigned long fh_ssr1;
unsigned long fh_lr;
    unsigned long fh_cr;
    unsigned long fh_xer;
    };
```

The $cpu_{13}$ vars private cpu data structure will also be modified to contain the physical addresses of the five alignment handler jump tables. The five alignment handler jump tables are comprised of: the initial dsisr jump table which determines the instruction to be emulated; the fixed-point load table indexed by target register; the fixed-point store table indexed by source register; the update table used to update the rA register of the instruction; and the floating-point operation table which is indexed by instruction and the target or source floating-point register.

Errors/Messages

Any error condition encountered during processing of the alignment exception will be considered a catastrophic system failure which will result in a panic. The only anticipated source of error is possibly kernel code making unaligned accesses which is to be considered a bug. An assert check for kernel-level invocation will be used to identify this condition. Unused jump entries in the dsisr table will point to panic code, but these entries will only be accessed in the event of a processor micro-code failure.

The resulting exception handling method and apparatus invention provides improved efficiency in the operation of a PowerPC processor running a microkernel operating system.

Although a specific embodiment of the invention has been disclosed, it will be understood by those having skill in the art that changes can be made to that specific embodiment without departing from the spirit and scope of the invention

What is claimed is:

1. In a data processing system including a memory and a processor that has a plurality of fixed point registers and a plurality of floating point registers, a method for managing process threads that are to be executed by the processor, comprising:

creating a process thread in the memory to be executed by the processor, and a process control block in the memory to store thread information;

storing in the process control block a non-floating point indication that the process thread is not enabled to perform floating point operations;

executing during a first occurring session, only fixed point operations with the process thread in the processor using the plurality of fixed point registers;

removing the process thread from the processor at a termination of the first session and storing first values of the fixed point registers in the process control block and, in response to said non-floating point indication, not storing the contents of the plurality of floating point registers in the process control block;

restoring the execution of the thread in the processor in a second occurring session by detecting said non-floating point indication in the process control block, and in response thereto, performing a lazy context restore operation by loading said first values from the process control block into the plurality of fixed point registers and not loading the plurality of floating point registers of the processor;

executing during said second occurring session, fixed point operations with the process thread in the processor using the plurality of fixed point registers;

attempting to execute a floating point instruction in the process thread during said second session, and in response thereto, calling an exception handler;

using said exception handler to store an alternate floating point indication in the process control block, to indicate that the process thread is enabled to perform floating point operations;

resuming execution of said floating point instruction in the process thread;

removing the process thread from the processor at a termination of said second session and storing second values of the plurality of floating point registers in the process control block in response to said alternate floating point indication; and restoring the execution of the process thread in the processor in a third occurring session by detecting said alternate floating point indication, and in response thereto, performing a lazy context restore operation by loading said second values from the process control block into the plurality of floating point registers of the processor.

2. In a data processing system including a memory, a first processor that has a first plurality of fixed point registers and a first plurality of floating point registers, a second processor that has a second plurality of fixed point registers and a second plurality of floating point registers, a method for managing a process thread that is to be executed by the processors, comprising:

creating the process thread in the memory to be executed by the first processor, and a process control block in the memory to store thread information;

storing in the process control block a non-floating point indication that the process thread is not enabled to perform floating point operations;

executing during a first occurring session, only fixed point operations with the process thread in the first processor using the first plurality of fixed point registers;

removing the thread from the first processor at a termination of the first session and storing first values of the first plurality of fixed point registers in the process control block and, in response to said non-floating point indication, not storing the contents of the first plurality of floating point registers in the process control block;

restoring the execution of the process thread in the second processor in a second occurring session by detecting said non-floating point indication in the process control block, and in response thereto, performing a lazy context restore operation by loading said first values from the process control block into the second plurality of fixed point registers and not loading the second plurality of floating point registers of the second processor;

executing during said second occurring session, fixed point operations with the process thread in the second processor using the second plurality of fixed point registers;

attempting to execute a floating point instruction in the process thread during said second session, and in response thereto, calling an exception handler;

using said exception handler to store an alternate floating point indication in the process control block, to indicate that the process thread is enabled to perform floating point operations;

resuming execution of said floating point instruction in the process thread in the second processor;

removing the process thread from the second processor at a termination of said second session and storing second values of the second plurality of floating point registers in the process control block in response to said alternate floating point indication; and restoring the execution of the process thread in the second processor in a third occurring session by detecting said alternate floating point indication in the process control block, and in response thereto, performing a lazy context restore operation by loading said second values from the process control block into the second plurality of floating point registers of the second processor.

3. In a data processing system an apparatus for managing process threads that are to be executed by a processor, comprising:

a memory in the data processing system;

a bus means coupled to the memory;

a processor coupled to the memory over the bus means, that has a plurality of fixed point registers and a plurality of floating point registers;

a process thread in the memory to be executed by the processor, and a process control block in the memory to store thread information;

said process control block storing a non-floating point indication that the process thread is not enabled to perform floating point operations;

said processor executing during a first occurring session, only fixed point operations with the process thread in the processor using the plurality of fixed point registers;

said processor removing the process thread from execution therein at a termination of the first session and storing first values of the fixed point registers in the process control block and, in response to said non-floating point indication, not storing the contents of the plurality of floating point registers in the process control block;

said processor restoring the execution of the process thread therein in a second occurring session by detecting said non-floating point indication, and in response thereto, performing a lazy context restore operation by loading said first values from the process control block into the plurality of fixed point registers and not loading the plurality of floating point registers of the processor;

said processor executing during said second occurring session, fixed point operations with the process thread in the processor using the plurality of fixed point registers;

an exception handler in said memory;

said processor attempting to execute a floating point instruction in the process thread during said second session, and in response thereto, calling said exception handler;

said exception handler storing an alternate floating point indication in the process control block, to indicate that the process thread is enabled to perform floating point operations;

said processor resuming execution of said floating point instruction in the process thread;

said processor removing the process thread therefrom at a termination of said second session and storing second values of the plurality of floating point registers in the process control block in response to said alternate indication; and said processor restoring the execution of the process thread therein in a third occurring session by detecting said alternate floating point indication in the process control block, and in response thereto, performing a lazy context restore operation by loading said second values from the process control block into the plurality of floating point registers of the processor.

4. In a data processing system, an apparatus for managing a process thread that is to be executed by processors, comprising:

a memory in the data processing system;

a bus means coupled to said memory;

a first processor coupled to said bus means, that has a first plurality of fixed point registers and a first plurality of floating point registers, a second processor coupled to said bus means, that has a second plurality of fixed point registers and a second plurality of floating point registers, a process thread in the memory to be executed by the first processor, and a process control block in the memory to store thread information;

said process control block storing a non-floating point indication that the process thread is not enabled to perform floating point operations;

said first processor executing during a first occurring session, only fixed point operations with the process thread in the first processor using the first plurality of fixed point registers;

said first processor removing the process thread therefrom at a termination of the first session and storing first values of the first plurality of fixed point registers in the process control block and, in response to said non-floating point indication, not storing the contents of the first plurality of floating point registers in the process control block;

said second processor restoring the execution of the process thread therein in a second occurring session by detecting said non-floating point indication in the process control block, and in response thereto, performing a lazy context restore operation by loading said first values from the process control block into the second plurality of fixed point registers and not loading the second plurality of floating point registers of the second processor;

said second processor executing during said second occurring session, fixed point operations with the process thread therein using the second plurality of fixed point registers;

said second processor attempting to execute a floating point instruction in the process thread during said second session, and in response thereto, calling an exception handler;

said exception handler storing an alternate floating point indication in the second processor, to indicate that the process thread is enabled to perform floating point operation;

said second processor resuming execution of said floating point instruction in the process thread therein;

said second processor removing the process thread therefrom at a termination of said second session and storing second values of the second plurality of floating point registers in the process control block in response to said alternate floating point indication; and said second processor restoring the execution of the process thread therein in a third occurring session by detecting said alternate floating point indication in the process control block, and in response thereto, performing a lazy context restore operation by loading said second values from the process control block into the second plurality of floating point registers of the second processor.

5. In a data processing system including a memory and a processor that has a plurality of fixed point registers and a plurality of floating point registers, a method for managing process threads that are to be executed by the processor, comprising:

creating an ID data structure in the memory to store the identity of a sole floating point thread executing in the processor;

creating a process thread in the memory to be executed by the processor, and a process control block in the memory to store thread information;

storing in the process control block a non-floating point indication that the process thread is not enabled to perform floating point operations;

executing during a first occurring session, only fixed point operations with the process thread in the processor using the plurality of fixed point registers;

removing the process thread from the processor at a termination of the first session and storing first values of the fixed point registers in the process control block and, in response to said non-floating point indication, not storing the contents of the plurality of floating point registers in the process control block;

restoring the execution of the process thread in the processor in a second occurring session by detecting said non-floating point indication in the process control block, and in response thereto, loading said first values from the process control block into the plurality of fixed point registers and not loading the plurality of floating point registers of the processor;

executing during said second occurring session, fixed point operations with the process thread in the processor using the plurality of fixed point registers;

attempting to execute a floating point instruction in the process thread during said second session, and in response thereto, calling an exception handler;

using said exception handler to store an alternate floating point indication in the process control block, to indicate that the process thread is enabled to perform floating point operations;

identifying said thread as a sole floating point thread in said ID data structure;

resuming execution of said floating point instruction in the thread;

removing the process thread from the processor at a termination of said second session and storing second values of the plurality of fixed point registers and omitting storing the plurality of floating point registers in the process control block in response to said identification of the process thread as a sole floating point thread in said ID data structure.

6. The method for managing process threads of claim 5, further comprising:

starting a second process thread having a floating point indication in said processor;

copying the contents of the floating point registers of the processor, and storing them in the process control block of the first said process thread;

executing the second process thread in the processor.

* * * * *